(12) United States Patent
Pohl et al.

(10) Patent No.: US 12,742,961 B2
(45) Date of Patent: Sep. 22, 2026

(54) PROJECTION SYSTEM FOR PROJECTING LISSAJOUS FIGURES AND MICROSCANNER WITH COUPLED OSCILLATORS

(71) Applicant: OQMENTED GMBH, Itzehoe (DE)

(72) Inventors: Leon Pohl, Schwentinental (DE); Ulrich Hofmann, Itzehoe (DE); Thomas Von Wantoch, Kiel (DE); Peter Blicharski, Essen (DE); Oleg Petrak, Itzehoe (DE); Christian Janicke, Kiel (DE)

(73) Assignee: OQMENTED GMBH, Itzehoe (DE)

( * ) Notice: Subject to any disclaimer, the term of this patent is extended or adjusted under 35 U.S.C. 154(b) by 302 days.

(21) Appl. No.: 18/556,043

(22) PCT Filed: May 5, 2022

(86) PCT No.: PCT/EP2022/062086
§ 371 (c)(1),
(2) Date: Oct. 18, 2023

(87) PCT Pub. No.: WO2022/268392
PCT Pub. Date: Dec. 29, 2022

(65) Prior Publication Data
US 2024/0272422 A1 Aug. 15, 2024

(30) Foreign Application Priority Data
Jun. 22, 2021 (DE) .................... 10 2021 116 151.7

(51) Int. Cl.
*G02B 26/10* (2006.01)
*G02B 26/08* (2006.01)

(52) U.S. Cl.
CPC ....... *G02B 26/101* (2013.01); *G02B 26/0858* (2013.01)

(58) Field of Classification Search
CPC .......................... G02B 26/101; G02B 26/0858
(Continued)

(56) References Cited

U.S. PATENT DOCUMENTS 5,988,508 A * 11/1999 Bridgelall .......... G06K 7/10871 235/462.4
2003/0042801 A1 3/2003 Miyajima et al.
(Continued)

FOREIGN PATENT DOCUMENTS

| | | |
|---|---|---|
| EP | 3173843 | 5/2017 |
| EP | 3447560 | 2/2019 |

(Continued)

OTHER PUBLICATIONS

International Search Report and Written Opinion for International (PCT) Patent Application No. PCT/EP2022/062086, dated Sep. 6, 2022, 9 pages.
(Continued)

*Primary Examiner* — Bumsuk Won
*Assistant Examiner* — Mitchell T Oestreich
(74) *Attorney, Agent, or Firm* — Sheridan Ross P.C.

(57) ABSTRACT

A projection system for projecting Lissajous figures on an observation field includes a microscanner. This has a deflection unit having a deflection element for deflecting an incident electromagnetic beam, a support structure, and a spring device, by means of which the deflection element is suspended in a gimballess manner on the support structure in such a way that, relative to the support structure, it can simultaneously perform a first rotary oscillation around a first oscillation axis and a second rotary oscillation around a second oscillation axis orthogonal thereto to cause a non-linear Lissajous projection in an observation field by deflecting an electromagnetic beam incident on the deflection element during the simultaneous oscillations. The
(Continued)

microscanner also has a control device that is configured to activate a drive device for driving the deflection unit in such a way that a respective, in particular resonant, drive effect with respect to at least one of the oscillations of the deflection element is settable individually. Furthermore, the spring device is designed in such a way that it mediates an amplitude-dependent mutual coupling between the oscillations. The control device is also configured to activate the drive device as a function of at least one detected state variable of the first oscillation in order to induce a drive effect on the second oscillation by influencing at least one state variable of the second oscillation, which counteracts falling below a predetermined minimum frequency distance between the respective instantaneous oscillation frequencies of the first oscillation and the second oscillation.

20 Claims, 8 Drawing Sheets

(58) Field of Classification Search
USPC .......................................................... 359/199.4
See application file for complete search history.

(56) References Cited

U.S. PATENT DOCUMENTS

| | | | |
|---|---|---|---|
| 2012/0320379 | A1 | 12/2012 | Hofmann et al. |
| 2019/0162948 | A1 | 5/2019 | Laaksonen et al. |
| 2020/0301130 | A1 | 9/2020 | Boni et al. |

FOREIGN PATENT DOCUMENTS

| | | |
|---|---|---|
| EP | 3751328 | 12/2020 |
| JP | 2011-053137 | 3/2011 |
| JP | 2013-003583 | 1/2013 |
| JP | 2018-132666 | 8/2018 |
| WO | WO 2016/199730 | 12/2016 |

OTHER PUBLICATIONS

English Translation of the International Search Report for International (PCT) Patent Application No. PCT/EP2022/062086, dated Sep. 6, 2022, 2 pages.

English Translation of the International Preliminary Report on Patentability for International (PCT) Patent Application No. PCT/EP2022/062086, dated Jan. 4, 2024, 8 pages.

* cited by examiner (A)

(B)

PROJECTION SYSTEM FOR PROJECTING LISSAJOUS FIGURES AND MICROSCANNER WITH COUPLED OSCILLATORS

CROSS REFERENCE TO RELATED APPLICATIONS

This application is a national stage application under 35 U.S.C. 371 and claims the benefit of PCT Application No. PCT/EP2022/062086 having an international filing date of 5 May 2022, which designated the United States, which PCT application claimed the benefit of German Patent Application No. 10 2021 116 151.7 filed 22 Jun. 2021, the disclosures of each of which are incorporated herein by reference in their entireties.

The present invention relates to a projection system for projecting Lissajous figures onto an observation field, and to a microscanner for such a projection system.

In the case of microscanners, which are also referred to in technical terms in particular as "MEMS scanners", "MEMS mirrors", or "micromirrors" or in English in particular as "microscanners" or "micro-scanning mirrors" or "MEMS mirrors", are micro-electro-mechanical systems (MEMS) or, more precisely, micro-opto-electro-mechanical systems (MOEMS) from the class of micro-mirror actuators for the dynamic modulation of electromagnetic radiation, in particular visible light. Depending on the design, the modulating movement of a single mirror can be translational or rotational around at least one axis. In the first case, a phase-shifting effect is achieved, in the second case, the deflection of the incident electromagnetic radiation. In the following, microscanners are considered, in which the modulating movement of a single mirror is rotational. In the case of microscanners, the modulation is generated via a single mirror, in contrast to mirror arrays, in which the modulation of incident light takes place via the interaction of multiple mirrors.

Microscanners can be used in particular for deflecting electromagnetic radiation in order to use a deflection element ("mirror") to modulate an electromagnetic beam incident thereon with respect to its deflection direction. In particular, this can be used to cause a Lissajous projection of the beam in a field of view. For example, imaging sensory tasks can be solved or display functionalities can be implemented. In addition, such microscanners can also be used to advantageously irradiate and thus also process materials. Other possible applications are in the area of lighting or illuminating certain open or closed spaces or spatial areas using electromagnetic radiation, for example in the context of headlight applications.

Both in the case of imaging sensors and in the case of a display function, a beam deflection system, in particular a microscanner, is used to deflect electromagnetic radiation such as a laser beam or a shaped beam from any other source of electromagnetic radiation at least two-dimensionally, for example horizontally and vertically, in order to thus scan or illuminate object surfaces within an observation field.

A deflection device for a projection system for projecting Lissajous figures onto an observation field is known from EP 2 514 211 B1, which is designed to deflect a light beam around at least one first and one second deflection axis to generate the Lissajous figures. The deflection device has a deflection unit for generating oscillations around the deflection axes and an activation device for generating activation signals for the deflection unit at a first and second activation frequency, which correspond to the resonant frequencies of the deflection unit. The deflection unit has a quality factor of greater than 3,000. The activation device comprises a first control loop, which is designed to control the first and/or the second activation frequency, depending on a measured phase position of the oscillations of the deflection unit, in such a way that the maximum amplitude of the oscillations remains in the resonance range of the deflection unit, wherein the activation frequencies do not have a fixed integer ratio. The activation device moreover includes a second control loop, which is designed to influence the resonant frequency of the first and/or the second deflection axes, depending on a line density of the Lissajous figures predetermined by the activation frequencies, such that the line density is in a predetermined tolerance range. The two deflection axes are decoupled by means of a cardanic suspension (gimbal), so that the associated oscillations around the two axes are completely decoupled from one another and are also phase-controlled completely independently of one another with the goal of keeping each of the two axes in resonance. The following relationship applies to the deflection device from EP 2 514 211 B1

$$f_{1R} \neq f_{2R}, \tag{1}$$

wherein $f_{1R}$ designates the resonant frequency of the first axis and $f_{2R}$ designates the resonant frequency of the second axis. For the mechanical torque $T_1$ or $T_2$, which is generated by the deflected spring of the first or second axis, respectively, the following applies:

$$T_1 = k_1 * \theta_1 \text{ and } T_2 = k_2 * \theta_2, \tag{2}$$

wherein $\theta_1$ and $\theta_2$ designate the respective mechanical amplitudes (deflection angles) of the mirror in the first axis and in the second axis, respectively, and $k_1$ and $k_2$ designate the respective spring constants of the spring of the first axis and the second axis, respectively. Due to the decoupling of the oscillation axes, it is particularly easy with such gimbal-based microscanners to achieve at least approximately rectangular illumination of the observation field by Lissajous figures.

In addition to such gimbal-based microscanners having completely decoupled axes, however, types of microscanners without a gimbal (so-called "gimballess mirrors" or "gimballess" microscanners or mirrors) are also known, which implement two or more oscillation axes without using a cardanic suspension of the mirror and in which a non-negligible, in particular a strong coupling between the individual oscillation axes can occur. The strength of such a coupling can in particular be dependent on the amplitude. A microscanner type is mentioned here as an example, which is constructed in such a way that it has a deflection unit having a mirror plate which is suspended on a surrounding frame by means of three rotationally symmetrically arranged spring elements, so that a biaxial microscanner results. A variant of such a type of microscanner, illustrated in FIG. 3, is known under the name "MiniFaros" mirror and is described in particular in Hofmann et al.: *Resonant biaxial 7-mm MEMS mirror for omnidirectional scanning*; J. Micro/Nanolith. MEMS MOEMS, 3-11 Jan.-Mar. 2014/Vol. 13(1).

Due to the couplings between the oscillation axes and the associated respective oscillations of the mirror around each one of these oscillation axes, gimballess mirrors tend to approximate the resonant frequencies with regard to the various oscillation axes quickly to one another when oscillating, so that as a result an essentially only elliptical (and thus linear, nonplanar) Lissajous illumination of the observation field occurs. In particular, at least approximately planar, in particular at least approximately rectangular, illumination of the observation field is thus made more difficult or even impossible.

The present invention is based on the object of providing an improved gimballess microscanner having coupled oscillation axes and a projection system equipped therewith, using which a planar Lissajous illumination of the observation field is possible. In particular, it is desirable to create a possibility for achieving at least approximately rectangular illumination by such a microscanner.

This object is achieved according to the teaching of the independent claims. Various embodiments and refinements of the invention are the subject matter of the dependent claims.

A first aspect of the invention relates to a microscanner for a projection system for projecting Lissajous figures onto an observation field. The microscanner comprises a deflection unit having (i) a deflection element for deflecting, in particular by means of reflection, an incident electromagnetic beam, (ii) a support structure, and (iii) a spring device. The spring device can include one or more spring elements. The deflection element is suspended in a gimballess manner by means of the spring device on the support structure in such a way that, relative to the support structure, it simultaneously performs a first rotary oscillation around a first oscillation axis and a second rotary oscillation around a second oscillation axis orthogonal thereto to cause a non-linear Lissajous projection in an observation field by deflecting an electromagnetic beam incident on the deflection element during the simultaneous oscillations.

The microscanner also includes a control device that is configured to activate a drive device for driving the deflection unit in such a way that a respective, in particular resonant, drive effect with respect to at least one of the oscillations of the deflection element is settable individually.

Furthermore, the spring device is designed in such a way that it mediates an amplitude-dependent mutual coupling between the oscillations.

The control device is also configured to activate the drive device as a function of at least one detected state variable of the first oscillation in order to induce a drive effect on the second oscillation by influencing at least one state variable of the second oscillation, so that the drive effect counteracts falling below a predetermined minimum frequency distance between the respective instantaneous oscillation frequencies of the first oscillation and the second oscillation.

A "Lissajous projection" in the meaning of the invention is to be understood in particular as a scanning of an observation field with the aid of electromagnetic radiation, which is caused by at least two mutually orthogonal harmonic oscillations of a deflection element that deflects the radiation into the observation field.

A "non-linear Lissajous projection" in the meaning of the invention is to be understood as a special case of a Lissajous projection, a scanning or illumination of an observation field with the aid of electromagnetic radiation, which is caused by at least two mutually orthogonal, not strictly harmonic, oscillations each around an associated oscillation axis of a deflection element that deflects the radiation into the observation field. In particular, the amplitude of at least a first one of these oscillations can be modulated with respect to a first oscillation axis as a function of the instantaneous amplitude of an oscillation with respect to at least one other oscillation axis, so that at least the first oscillation does not represent a linear oscillation, i.e., it does not follow Hook's law with an amplitude-independent oscillation spring constant.

An "axis" or synonymously "oscillation axis" in the meaning of the invention is to be understood as an axis of rotation (rotational axis) of a rotational movement. It is a straight line that defines or describes a rotation or turn.

A "drive device" in the meaning of the invention is to be understood as a device that includes one or more actuators for driving the deflection unit, i.e., the simultaneous rotational oscillations of the deflection element relative to the support structure and with respect to at least the first and the second, and possibly also a third oscillation axis. As possibly used herein, the terms "comprises," "contains," "involves," "includes," "has," "having," or any other variant thereof are intended to cover non-exclusive inclusion. For example, a method or a device that comprises or includes a list of elements is not necessarily restricted to these elements, but may involve other elements that are not expressly listed or that are inherent to such a method or device.

Furthermore, unless expressly stated to the contrary, "or" refers to an inclusive or and not to an exclusive "or". For example, a condition A or B is met by one of the following conditions: A is true (or present) and B is false (or absent), A is false (or absent) and B is true (or present), and both A and B are true (or present).

The terms "a" or "an" as used herein, are defined in the meaning of "a/one or more". The terms "another" and "a further" and any other variant thereof are to be understood to mean "at least one other".

The term "plurality" as used herein is to be understood to mean "two or more".

In particular, one or more of the following advantages can be achieved with the aid of the above-mentioned microscanner and the above-mentioned object can thus be achieved:

Due to the special activation of the drive device in the above-mentioned microscanner, despite the existing coupling between the various oscillations or oscillation axes, it can be achieved that the respective oscillation frequencies, in particular resonant frequencies, of the individual oscillations maintain a minimum frequency distance from one another, so that there is no frequency synchronization of these frequencies for different axes, which would ultimately result in elliptical Lissajous figures. This in turn enables a constant, planar, in particular also an, at least essentially, rectangular illumination of an observation field in the framework of the projection, in particular also in the case of gimballess mirrors. Among other things, a Lissajous-like excitation of the deflection element (mirror) can be achieved with the microscanner even if the resonant frequencies of different axes are close together, despite this circumstance, even with many gimballess mirrors, where this would not be possible without a control of the above-mentioned type.

Since gimballless mirrors of the same mirror size generally have a smaller structural form than gimbal-based mirrors, a reduction in the required installation space can also be achieved with a comparable projection result.

Because at least one of the oscillators (corresponding to the oscillation about a specific oscillation axis) has a nonlinear characteristic, i.e., does not correspond to Hook's law with an amplitude-independent spring constant over its entire amplitude range, a generally broader tuning range (frequency bandwidth), especially at high quality, may be achieved, in particular in relation to gimbal-based mirrors.

The microscanner also opens up the possibility of maintaining defined frequency ratios over wide temperature ranges, since temperature-related fluctuations of the oscillator properties can also be compensated for in terms of maintaining the minimum frequency distance between the frequencies of the various oscillation axes. In the case of gimballess mirrors, temperature-related fluctuations in the oscillator properties typically occur at equal strengths, in the same direction, and simultaneously for both oscillator axes, in contrast to gimballed mirrors, in which this typically occurs sequentially and to different degrees.

Even in the case of strongly coupled axes and thus pronouncedly non-linear microscanners, the above-mentioned control can generally enable oscillation in at least two dimensions and at different resonant frequencies for the various axes.

Preferred embodiments of the microscanner according to the first aspect are described hereinafter, which in each case, unless expressly excluded or technically impossible, can be combined as desired with one another and with the further described other aspects of the invention.

According to some embodiments, the control device is furthermore configured to activate the drive device in addition as a function of at least one detected state variable of the second oscillation in order to induce a drive effect on the first oscillation by influencing at least one state variable of the first oscillation, which counteracts falling below a predetermined minimum frequency distance between the respective instantaneous oscillation frequencies of the first oscillation and the second oscillation. While the above-described basic form of the microscanner in particular also allows "primary-secondary" operation in the sense that only one of the oscillations (secondary oscillation) is influenced as a function of at least one detected state variable of the other oscillation (primary oscillation), In the embodiments mentioned here, both the first and the second oscillations are each influenced as a function of at least one detected state variable of the respective other oscillation, in particular in an equal manner. In this way, among other things, a greater variety of control options can be implemented and a particularly effective, in particular fast, automatic dynamic control of the oscillations involved can be achieved while avoiding frequency synchronization of the amplitude-dependent operating frequencies, in particular resonant frequencies.

According to some alternative embodiments thereto, in contrast, the control device is configured to activate the drive device independently of a state variable of the second oscillation in order to induce a drive effect on the first oscillation while influencing at least one state variable of the first oscillation. These embodiments thus enable the above-mentioned "master-slave" operation in particular. Since only one of the oscillations (specifically the second oscillation) has to be controlled by the control device as a function of at least one state variable of the other (first) oscillation, a particularly simple implementation of the control device can be made possible here.

According to some embodiments, the respective at least one state variable of a respective oscillation is determined by its amplitude, frequency, or phase or as a function of at least one of these variables. In particular, at least one of the detected state variables can be determined by the amplitude of the oscillation. This is particularly advantageous in that, in the case of a non-linear oscillation, the spring stiffness $k(\theta)$ and thus also the frequency $f(\theta)$ with respect to one axis are each a function of the amplitude $\theta$ with respect to this axis, and thus a modulation of the respective other oscillation as a function of the detected amplitude $\theta$ of this axis, enables the minimum frequency distance to be ensured immediately and in a particularly dynamic manner.

According to some embodiments, the control device is configured to carry out the activation of the drive device to induce the respective drive effect on at least one oscillation driven thereby in the sense of a closed-loop control as a function of at least one repeatedly, in particular continuously, detected controlled variable. which is a state variable of the respective other oscillation or is defined as a function thereof. With the aid of such a closed-loop control, a dynamic activation of the drive device can be achieved in a particularly effective and optimized manner for the purpose of ensuring the minimum frequency distance, wherein in particular it is also possible to react to unforeseen disturbances, which as a rule could not be effectuated to the same extent with a simple control without feedback. In addition, this opens up the possibility of targeted compensation of, in particular periodic, changes in amplitude-dependent spring stiffnesses of the spring device with respect to at least one axis, in particular of non-linear coupling effects which could otherwise cause distortions, such as constrictions in the planar area of the observation field illuminated by the microscanner. On the other hand, however, such non-linear coupling effects can also be amplified or deliberately modulated, in particular depending on the application, in order to achieve particular shapes of the illuminated planar area, in particular those that deviate from an elliptical or rectangular shape. For headlight applications, this can be used in particular for the static or dynamic shaping of the illuminated area (which is flat in cross-section) generated by a headlight system based on the microscanner. Consider here, for example, a glare-free high beam for a motor vehicle, in which the light cone of the headlight is dynamically shaped in such a way that road users in the traffic area (at the same time the observation field) who are at risk of being blinded are automatically hidden from the high beam distribution.

According to some embodiments, the detection of this controlled variable, especially when the controlled variable for the drive control of the respective driven oscillation is defined as a frequency or phase of the respective other oscillation or as a function of at least one of these state variables, can always take place at the same amplitude of this respective other oscillation, for example always at a zero crossing of the amplitude profile of the oscillation. In this way, a closed-loop control that is particularly robust with respect to disturbances can be achieved, which typically has lower measurement errors due to the measurement conditions that are always the same with regard to the amplitude.

According to some embodiments, the control device can moreover be configured to carry out both the first oscillation and the second oscillation in the sense of a closed-loop control as a function of at least one repeatedly, in particular continuously, detected controlled variable, which is a state variable of the respective other oscillation or is defined as a function thereof. In this case, these respective closed-loop controls for the first and the second oscillation are each designed to be dynamically configurable with respect to their respective slope and control speed as a function of the slope and control speed of the respective other closed-loop control. This tuning is advantageous in that it allows the axles to oscillate at approximately the same speed and thus the original resonant frequencies of the axles to be shifted at approximately the same speed, in particular towards higher frequencies when the spring stiffness increases with increasing amplitude (English: "spring stiffening"). Because of the approximate synchronization of the frequency shifts, the minimum frequency distance for the difference between the shifting frequencies can be ensured in a particularly simple and reliable manner. Such a coordinated configuration of the control loops can thus in particular avoid one of the control loops controlling significantly faster than the other and thus the risk that there is an undesired overlap of the resonance ranges, in particular resonant frequencies of the oscillations, so that the minimum frequency distance is not reached in an undesirable manner and as a result, only a linear, in particular elliptical, Lissajous projection occurs instead of the planar, in particular rectangular, illumination desired according to the object.

According to some embodiments, the control device is configured to activate the drive device to induce the respective drive effect on the respective oscillation driven thereby in the sense of a closed-loop control as a function of the at least one detected state variable of the respective other oscillation. In the sense of control technology, a pure "control" ("open-loop control") of the drive device can therefore be used here. Such an open-loop control can advantageously be implemented with less implementation effort in comparison to the above-mentioned regulations. In particular, however, it is also conceivable to combine such an open-loop control with at least one of the above-mentioned closed-loop controls. In particular, one oscillation could have an open-loop control and another oscillation could have a closed-loop control.

According to some of these control-based embodiments, the control device is configured to control the drive device to induce the respective drive effect on the respective oscillation thereby driven in such a way that the drive device effectuates an alternating, with respect to the first oscillation and the second oscillation, and step-by-step increase of the respective amplitude or frequency of these oscillations. For example, the microscanner, more precisely its deflection element, could oscillate in such a way that initially the frequency $f_1$ of the first oscillation is incremented (i.e., increased by a defined frequency step), then the frequency $f_2$ of the first oscillation is incremented, then $f_1$ is incremented again, then $f_2$ is further incremented again, and so on, until the desired drive frequencies are reached. In this way, oscillation of the microscanner can also be achieved using mere open-loop control, in which there is no undesired overlap of the resonance ranges, in particular resonant frequencies of the oscillations, and thus the minimum frequency distance is maintained and, as a result, purely elliptical Lissajous projections instead of the planar, in particular rectangular illumination desired according to the object can be avoided. The sequence of the increments can in particular also be stored irretrievably in a memory, and in particular can have been determined on the basis of a preceding calibration process. Additionally or alternatively to the calibration, this also allows the oscillation to be configured by defining and storing the desired sequence of the increments.

According to some embodiments, the control device is also configured to activate the drive device (i.e., to control or regulate it) in such a way that the respective frequency of at least one of the oscillations, in particular an oscillation that is mainly driven by this activation, is in a predetermined, limited resonance range surrounding a present resonant frequency of this oscillation. As usual, the resonant frequency is given by the frequency $f_R$ at which the maximum amplitude occurs. The limits of the resonance range for a resonant frequency $f_R$ can be determined in particular by the values $f_R \pm 70\%$, preferably $f_R \pm 40\%$, more preferably $f_R \pm 20\%$, even more preferably $f_R \pm 10\%$ of the frequency value $f_R$ of the resonant frequency. (The percentages here relate in each case to the value $f_R$). This has the advantage in particular that maximum amplitudes and thus the greatest possible extensions of the illuminated area of the observation field can be achieved in the resonance range, in particular at the value f, which is relevant in particular for large-area illuminations.

According to some embodiments, the minimum frequency distance is fixed as a constant dimension. In particular, this enables a particularly simple implementation, since once this variable has been defined, no more dependencies of any kind have to be taken into consideration for determining this variable, in particular not dynamically.

On the other hand, according to some alternative embodiments, the minimum frequency distance is defined as a variable dimension that depends on the respective current amplitude of the first oscillation or the second oscillation or on the respective current amplitudes of these two oscillations. Better adaptability to different system states is enabled in this way. In particular, an oscillation of the microscanner can be controlled more precisely in this way and an undesired overlapping of resonance ranges on different axes can also be effectively avoided when the frequency changes of these axes do not run at the same rate with increasing oscillation.

According to some alternative embodiments thereto, the spring device is designed such that the strength of the amplitude-dependent mutual coupling between the first oscillation and the second oscillation increases steadily with increasing amplitude of at least one of these two oscillations. This can be achieved in particular in that the spring device as a whole or possibly its individual springs is or are designed such that its or their respective spring stiffness k increases with increasing amplitude, i.e., when $$k = k(\theta) \text{ with } k(\theta_a) > k(\theta_b) \text{ for } \theta_a > \theta_b. \tag{3}$$

This is also known as "spring stiffening" or "stress stiffening". In this way, the following advantages can be implemented in particular: The frequency bandwidth or the width of the resonance can be increased in the desired manner via this deliberately induced stiffening. The more pronounced this effect is, the more suitable such a two-axis microscanner having two-axis "spring-stiffening" behavior is for an unregulated open-loop operation (solely open-loop control) that is very easy to implement. If only one oscillation shows this pronounced spring-stiffening and the second oscillation does not, it may be necessary to provide at least one oscillation with a closed-loop control, since the bandwidth may then possibly not be sufficient for stable open-loop control. This state is not as advantageous as the state having two oscillator suspensions that show pronounced spring-stiffening. If the suspensions are designed in such a way that the oscillation having the higher resonant frequency shows "spring-stiffening" and the other "spring-lowering" behavior, it can be ensured that the oscillations do not approach one another and synchronize with pure open-loop control as well as closed-loop control or combinations thereof. If the suspension of the oscillator having the lower resonant frequency is designed with "spring stiffening" behavior and that with the higher resonant frequency with "spring lowering" behavior, increases in amplitude can only be achieved by bringing the oscillation frequencies closer together. As a rule, it is desirable to avoid this case, since it is accompanied by few usable properties. If both oscillators show "spring lowering" behavior, which is relatively difficult to achieve in terms of design and is therefore rarely the case, an advantageously simple implementation based on pure open-loop control can in turn be achieved with a correspondingly strong expression, since the frequency bandwidth of the respective resonances then permits a sufficient stability of the state. According to the invention, the controller still has to be designed in such a way that the desired frequency distance is retained. This state can then be kept stable again by appropriate control loops.

According to some embodiments, the microscanner is designed as a biaxial microscanner, in which the deflection unit includes a deflection element that is suspended on a frame, which serves as a support frame and surrounds it, by means of three rotationally symmetrically arranged spring elements. In this case, the microscanner can in particular include a deflection unit of the "MiniFaros mirror" type. Microscanners according to these embodiments regularly have a very strong coupling between the oscillations of the various axes and therefore a strong non-linear resonance. This in turn enables large tuning ranges, i.e., a large bandwidth (for example approximately 200 Hz in some MiniFaros mirror variants), within which the deflection element can oscillate in resonance (resonance range).

According to some alternative embodiments thereto, the microscanner is designed as a biaxial gimballess microscanner, in which: (i) the deflection unit includes a deflection element that is suspended clamped firmly on two opposite sides by means of a flexible spring on a rigid frame used as a support frame, in particular a chip frame made of a semiconductor material; and (ii) the flexible springs each have two arcuate sections which are connected to one another at their end faces and otherwise extend spaced apart from one another and extend around the deflection element, wherein the respective section of each flexible spring adjacent to the deflection element is connected to the deflection element and the respective section of each flexible spring adjacent to the frame is connected to the frame. The deflection element and the flexible springs, optionally also the frame in addition, can in particular be formed in one piece, i.e., can be manufactured from a single substrate. In such a microscanner, the respective spring stiffness with respect to each of the axes is dependent both on the instantaneous amplitude of the deflection element in relation to itself and on the instantaneous amplitude of the deflection element in relation to the other axis. Thus, during operation of the microscanner, the first oscillation periodically modulates the second oscillation and vice versa. In addition, the two oscillations continuously exchange vibrational energy and temporarily store it in the meantime. With such a mirror, planar illumination of the observation field can be achieved in particular, which has the shape of deformed, in particular constricted rectangles, wherein with appropriate activation of the drive device to compensate for the mutual modulation, at least approximately rectangular planar illumination can also be achieved.

According to some embodiments, the control device is configured, in the context of the activation of the drive device to drive the deflection unit in the sense of an amplitude adjustment, a frequency adjustment, or a phase adjustment, to set at least one corresponding state variable of the first oscillation, the second oscillation, or each of these two oscillations individually to a specific setpoint value. In particular, phase adjustments, in particular phase regulations, are well suited to induce an activation-based, partial or complete compensation of the mutual modulations of the various oscillations and also to maintain a resonant operation of the microscanner.

According to some embodiments, the deflection element is suspended in a gimballess manner on the support structure by means of the spring device in such a way that it can simultaneously additionally execute a third rotational oscillation relative to the support structure with respect to a third oscillation axis that is orthogonal in each case to the first and second oscillation axes in order to, by deflecting an electromagnetic beam incident on the deflection element during the three simultaneous oscillations, cause a non-linear Lissajous projection in the observation field. The spring device is also designed in such a way that it mediates an amplitude-dependent mutual coupling between the third oscillation and the first oscillation or the second oscillation or both. Thus, using the third oscillation axis or third oscillation, in particular even more complex projection images can be performed in which, for example, the intensity or phase of the deflected radiation can (additionally) be modulated by the movement around the third oscillation axis, for example by corresponding inhomogeneous design of the reflectivity or the structure of the reflecting surface.

According to some embodiments, the control device is furthermore configured to activate the drive device as a function of at least one detected state variable of the first or second oscillation in order to induce a drive effect on the third oscillation by influencing at least one state variable of the third oscillation, which counteracts falling below a predetermined minimum frequency distance between the respective instantaneous oscillation frequencies of the first and second oscillations, on the one hand, and the third oscillation, on the other hand. Thus, the frequency decoupling of the various axes can also be extended to the third axis and thus such a coupling can be used to compensate for or avoid undesired imaging disturbances that would otherwise occur during the projection.

In some embodiments, the microscanner furthermore includes an encapsulation, by means of which at least the deflection element and the spring device are encapsulated in a hermetically sealed manner such that the deflection element in the encapsulation is capable of performing the oscillations and is suspended on the spring device so it can oscillate. The encapsulation has an encapsulation section bridging the deflection element, through which the radiation to be deflected can be radiated into the spatial area encapsulated by the encapsulation and can be emitted again therefrom after it has been deflected at the deflection element. The encapsulation or the capsule section can in particular consist of a glass material or contain one that is at least predominantly, preferably largely, transparent to electromagnetic radiation in a spectral range relevant to the use of the microscanner.

The use of such an encapsulation makes it possible in particular to reduce the pressure in the hermetically sealed, encapsulated spatial area, in particular to evacuate this spatial area in order to reduce or even largely eliminate gas friction losses, in particular air friction losses, or other disturbances of the oscillations of the deflection element. This is particularly advantageous when using the microscanner for Lissajous display applications, when the deflection element and its spring suspension are not operated in ambient air but at reduced pressure, in particular in a vacuum, because the friction losses due to the air damping can be avoided in a very efficient manner in this way and as a result the microscanner can, for example, achieve oscillation amplitudes that are up to 100 times greater than in air at atmospheric pressure. Accordingly, the achievable optical resolution can also be correspondingly increased, for example by a factor of up to 100, in one or each of the first and second oscillation axes.

In some of these embodiments, the capsule section has a dome-shaped (cupola-shaped), a planar, or a right-angled U-shaped formation in cross section. The dome-shaped formation has the particular advantage that incoming and outgoing electromagnetic beams, in particular laser beams, are hardly deflected by the wiring. Insofar as incident beams are reflected on the dome-shaped capsule section, this usually takes place in a different direction than the direction of the outgoing beam reflected on the deflection element, so that undesired interactions or superimposition of the beams can be effectively avoided here. The planar formation and the U-shaped formation right-angled in cross section, on the other hand, are distinguished in each case by their particularly simple producibility and handling during manufacturing of the microscanner. The U-shaped formation right-angled in cross section can also offer the advantage that any intermediate layers (spacer layers) that would otherwise be required in the substructure of the encapsulation for the formation of a spatial area enclosed by the encapsulation that is sufficiently large for the movement of the deflection element can be avoided or reduced in number or thickness.

A second aspect of the invention relates to a projection system for projecting Lissajous figures onto an observation field, wherein the projection system includes a microscanner according to the first aspect of the invention, in particular according to one of the embodiments and variants thereof described herein.

According to some embodiments, the projection system can in particular include a radiation source for generating the electromagnetic beam to be deflected by the microscanner (and thus "incident").

According to some embodiments, the control device can furthermore be configured to supply the radiation source with at least one modulation signal, depending on which the incident electromagnetic beam is modulated. The modulation can relate in particular to its temporal or spatial intensity profile. Depending on the type of radiation source, however, other types of modulation are also conceivable, in particular modulation of the wavelength (for example color) or wavelength distribution of the radiation emitted by the radiation source. When images are projected, the modulation accordingly takes place depending on the instantaneous deflection direction, so that corresponding pixels are generated on the projection surface with the associated pixel value of the corresponding pixel of the image to be displayed by modulation.

The features and advantages explained with respect to the first aspect of the invention also apply correspondingly to the above-mentioned projection system according to the second aspect the invention.

Further advantages, features, and possible applications of the present invention result from the following more detailed description in conjunction with the figures.

In the figures:

FIG. 1 schematically shows an exemplary structure of a microscanner according to some embodiments of the invention;

FIG. 2 schematically shows an exemplary structure of a projection system for projecting Lissajous figures onto an observation field according to some embodiments of the invention;

Figure 1:
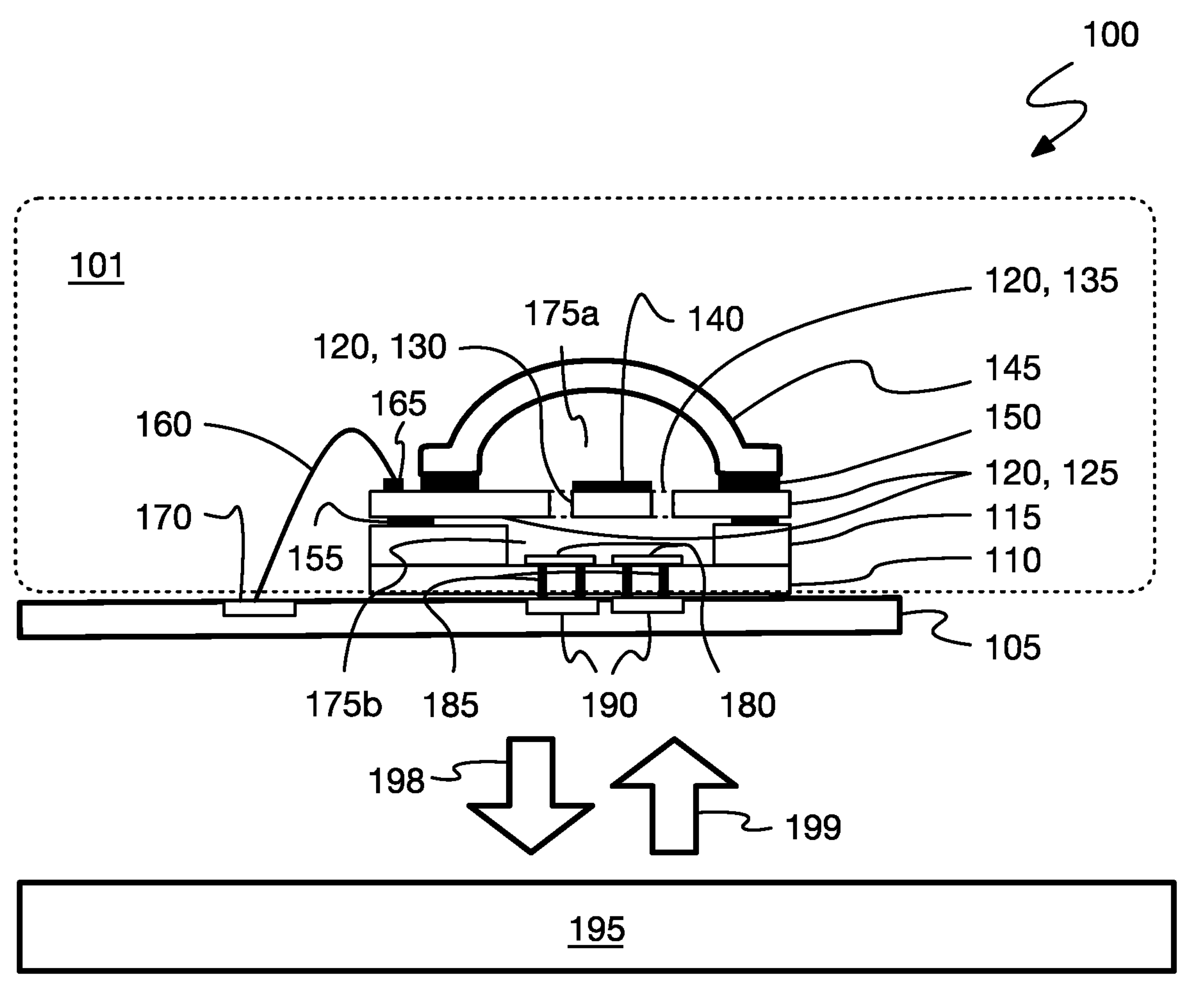
Figure 9:
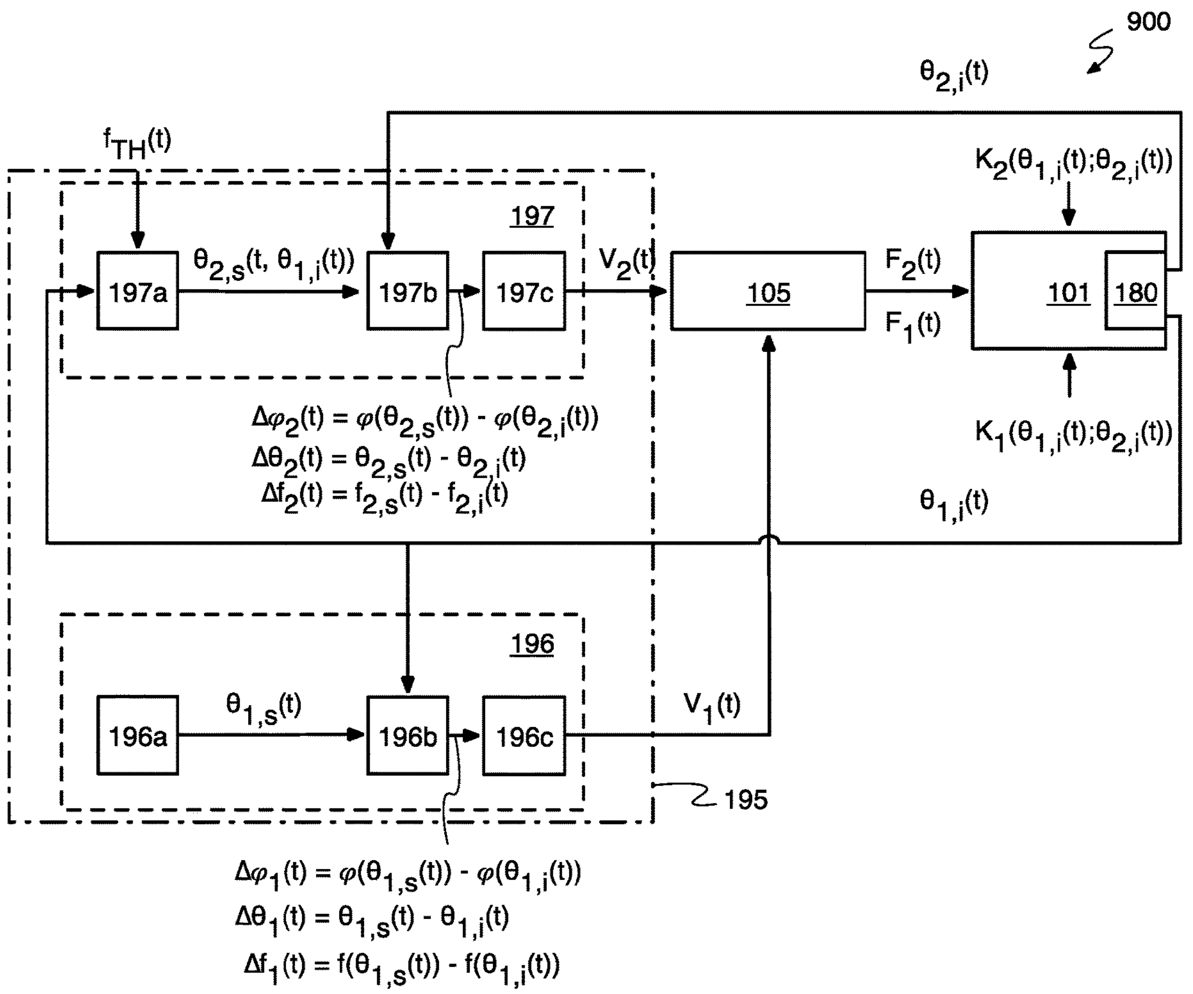
Figure 10:
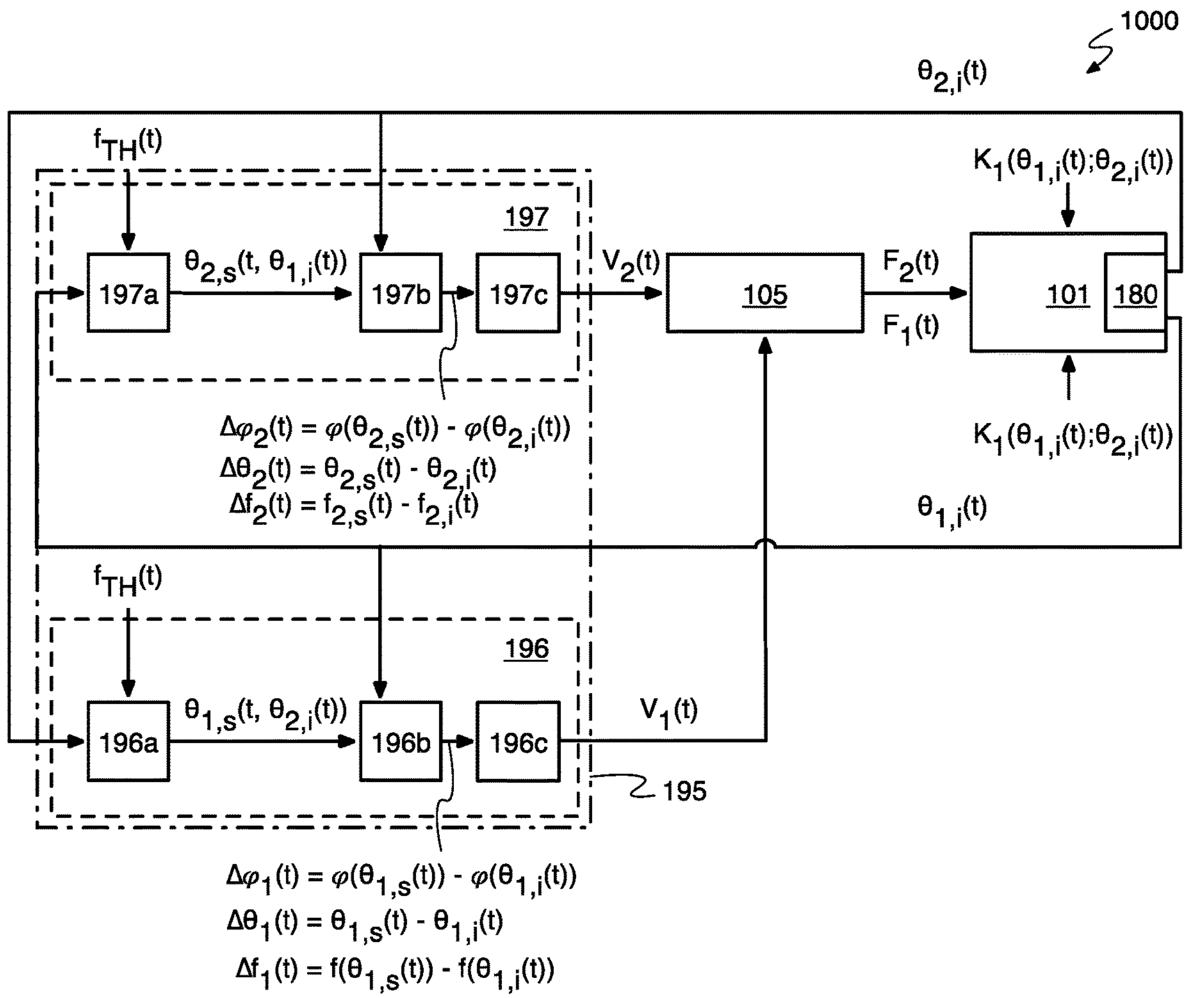

FIG. 9 shows a block diagram of an exemplary double closed-loop control (closed-loop for both axes) of the microscanner from FIG. 1 according to an embodiment of the invention, wherein signal-based feedback between the two closed-loop controls only takes place unidirectionally, however; and FIG. 10 shows a block diagram of an exemplary double closed-loop control (closed-loop for both axes) of the microscanner from FIG. 1 according to an embodiment of the invention, wherein signal-based bidirectional feedback takes place between the two closed-loop controls.

Throughout the figures, the same reference signs are used for the same or corresponding elements of the invention.

FIG. 1 schematically illustrates, in a lateral cross-sectional view, an exemplary embodiment 100 of a microscanner according to an exemplary embodiment of the invention having a drive device 105 for driving the microscanner 100.

The microscanner 100 includes a piezo actuator 105 as a drive device, which at the same time forms a bottom plate on which a stacked, multilayer structure made of various substrates stacked one on top of another is arranged, which overall forms a deflection unit 101 of the microscanner. The core of this multilayer structure is formed by a first substrate 120 (chip) made of a semiconductor material, which is structured into different, coherent portions. These portions include a frame portion 125, a mirror portion ("mirror") 130 used as a deflection element, and multiple spring elements 135 each connecting the mirror portion 130 to the frame portion and formed as connecting webs.

The mirror portion 130 is movably mounted in the frame portion 125 via the spring elements 135, which can twist, in such a way that the mirror portion 130 can perform a two-dimensional, in particular biaxial, oscillating movement relative to the frame portion 125. The connecting webs 135 thus represent a spring suspension of the mirror portion 130. The connecting webs or spring elements 135 together form a spring device of the deflection unit 101. This spring device is designed in such a way that it mediates an amplitude-dependent mutual coupling between the oscillations to the individual oscillation axes. This results in a non-linear spring characteristic of the spring device as a whole.

The mirror portion 130 is provided with a metallic coating 140 on one of its main surfaces such that this metallic layer 140 forms a mirrored reflection surface for deflecting incident electromagnetic radiation, in particular a laser beam, for example in the visible or infrared range of the electromagnetic spectrum. The mirror portion 130 having its coating 140 thus forms a deflection element of the deflection unit 101.

The metal layer 140 can in particular contain one or more of the following materials: Al, Ti/Au, Ti/Pt/Au, Ta/Pt/Au, Cr/Au, Ta/Au, Ti/Ag, Ta/Ag, Ta/Pt/Ag, Ti/Pt/Ag, Ti/TiW/Au, Ti/W/Au, Ti/W/Ag, Ti/TiW/Ag, etc. In particular, additional dielectric layers can be used above or below the metal layers in order to improve the quality of the layers or to protect the metal layers from corrosion. In other cases, the mirror layer can be formed entirely from dielectric layer stacks in order in this way to achieve particularly high reflectivities for a specific wavelength range. The above-mentioned materials can have both high long-term durability and good mirror properties. The shape of the mirrored reflection surface 140 can be circular, in particular as shown in each case in FIGS. 3 and 5, without this being understood as a restriction. In particular, rectangular or other polygonal shapes are also conceivable. Various exemplary implementations of such deflection elements or, in particular, of first substrates 120 will be discussed in detail hereinafter with reference to FIGS. 3 and 5.

Furthermore, the deflection unit 101 optionally contains a second substrate 145 made of a glass material. The second glass substrate has a cupola shape and is hermetically connected by means of a substrate bonding material 150, for example a glass frit material, to the frame portion 125 of the first substrate 120 in order to form a first (in FIG. 1 "upper") portion 175*a* of a cavity 175 surrounding the mirror portion 130 on both sides.

On the side of first substrate 120 opposite to the second substrate 145, in the multilayer substrate 101, a third substrate 110, which is used as a bottom plate, and between the first substrate and the third substrate, a further, fourth substrate 115, which is designed as a spacer or (equivalently) spacer layer are located. The third and the fourth substrate can each be manufactured in particular from a semiconductor material.

The fourth substrate 115 is structured in such a way that it includes a cavity which is arranged below the mirror portion 130 in such a way that, together with its bottom boundary provided by the bottom plate 110, it forms a second (in FIG. 1 (*a*) "lower") portion 175*b* of the cavity 175.

The respective adjacent individual substrates are connected to one another in a hermetically sealed manner, for example again by means of a substrate bonding material 150 or 155, so that the cavity 175 is designed to be hermetically sealed overall when the second substrate 145 is used. It is preferably evacuated, so that there is a residual gas pressure in it, which is preferably significantly below normal conditions (101.325 kPa=1013.25 mbar), which is preferably below 10 kPa/$10^{+1}$ kPa ($10^{-1}$ mbar), particularly preferably $10^{-1}$ kPa ($10^{-3}$ mbar). Typically, the first to fourth substrates 110, 115, 120, 145 each have the same basic shape, in particular a rectangular shape, although other shapes are also possible.

The piezo actuator 105 is configured to generate a vibration movement when it is electrically activated and to transmit it to the deflection unit 101 and in particular to its mirror portion 130. In a variant of this, the vibration movement is multidimensional, so that multiple oscillations can be excited at the same time to different orthogonal oscillation axes when the vibration frequency (frequencies) come into the resonance range of the respective oscillation. Alternatively, the drive device, in particular in this example the piezo actuator 105, can also be configured such that each of the oscillations is separately excitable deliberately via a corresponding special movement component, in particular a tilting of the actuator around an axis extending in parallel to the corresponding oscillation axis.

In this and other ways, the mirror portion 130 can be excited with its mirror surface 140 to perform an oscillating movement, in particular a resonant or forced multidimensional oscillating movement such as a biaxial Lissajous movement relative to the frame portion 125. The uniaxial oscillation components around a corresponding one of the oscillation axes are each referred to hereinafter as an oscillation. During these oscillations, the mirror portion 130 can move out of the plane of the first substrate 120 by tilting (rotating) around the respective axis of oscillation and thereby plunge into the portions 175*a* and 175*b* of the cavity 175 on both sides. Due to the evacuation of the cavity 175, the remaining friction in the gas is very low, so that only a small, in particular a negligibly small, damping occurs as a result.

Furthermore, the microscanner 100 includes a capacitive position determination device. The position determination device includes two electrodes between which an electrical capacitance measurement is carried out for the purpose of determining the respective current amplitude position, in particular orientation, of the mirror portion 130. A first of the two electrodes is formed by the metallic mirror surface 140, which is thus intended to perform a dual function (deflection of incident electromagnetic radiation; electrode). The second of the two electrodes is embodied on the inside of the bottom plate 110 in the cavity area 175 as a corresponding metallic coating 180 of the bottom plate 110. In the present example, this bottom electrode 180 is designed as a multipart structured metal layer. The shape of this bottom electrode 180 essentially corresponds in type and preferably at least approximately also in size to the shape of the mirror portion 130 lying parallel thereto in the non-deflected idle state of the mirror portion 130, or of its reflective layer or mirror surface 140.

The bottom electrode 180 is electrically contacted via one or more so-called vias, i.e., connection tunnels filled with electrically highly conductive (conductivity>$10^6$ S/m), usually metallic, material, which extend from the bottom electrode 180 through the bottom plate 110 to the corresponding connection pads 190 on the piezo actuator 105. The mirror electrode 140, in turn, is electrically connected via a rewiring layer to a connection pad 165 arranged on the first substrate 120 outside of the cupola formed by the second (glass) substrate, and from there by means of a bonding wire 160 to a further connection pad 170 on the piezo actuator 105. The mirror electrode 140 is thus electrically contacted overall via the connection pad 170. Consequently, an electrical capacitance measurement used to determine the position of the mirror portion 130 can be carried out between the connection pads 190 and 170.

The microscanner 100 also includes a control device 195, which is configured in particular to control the piezo actuator 105 for driving the deflection unit by means of corresponding electrical control signals 198 (in the sense of control or regulation) in such a way that a respective, in particular resonant, drive effect with respect to at least one of the oscillations of the deflection element 130, 140 is individually settable. In particular, the control device is configured, in particular programmed, to control the piezo actuator 105 as a function of at least one detected state variable of an oscillation along a first oscillation axis $A_1$ ("first oscillation") in order to induce a drive effect on the oscillation to the second oscillation axis orthogonal to the first $A_2$ ("second oscillation") by influencing at least one state variable of the second oscillation, which counteracts falling below a predetermined minimum frequency distance $f_{TH}$ between an instantaneous oscillation frequency $f_{1,i}$ of the first oscillation and an instantaneous oscillation frequency $f_{2,i}$ of the second oscillation. In addition, the control device 195 is configured to receive measurement signals 199 from the deflection unit based on the above-mentioned electrical capacitance measurement, in particular measurement signals that indicate an instantaneous position of the deflection unit with respect to the axes $A_1$ and $A_2$. In particular, the amplitude, the frequency, and the phase of the respective oscillations come into consideration here as state variables.

Optionally, the control device 195 can also be configured to carry out additional control in the opposite direction, i.e., to activate the piezo actuator 105 as a function of at least one detected state variable of the second oscillation in order to induce a drive effect on the first oscillation by influencing at least one state variable of the first oscillation. which counteracts falling below the predetermined minimum frequency distance between an instantaneous oscillation frequency $f_{1,i}$ of the first oscillation and the instantaneous oscillation frequency $f_{2,i}$ of the second oscillation. Details of the open-loop and closed-loop controls of the oscillations that can be carried out in this context by means of the control device 195 will be explained hereinafter, in particular with reference to FIGS. 7 to 10.

Figure 2:
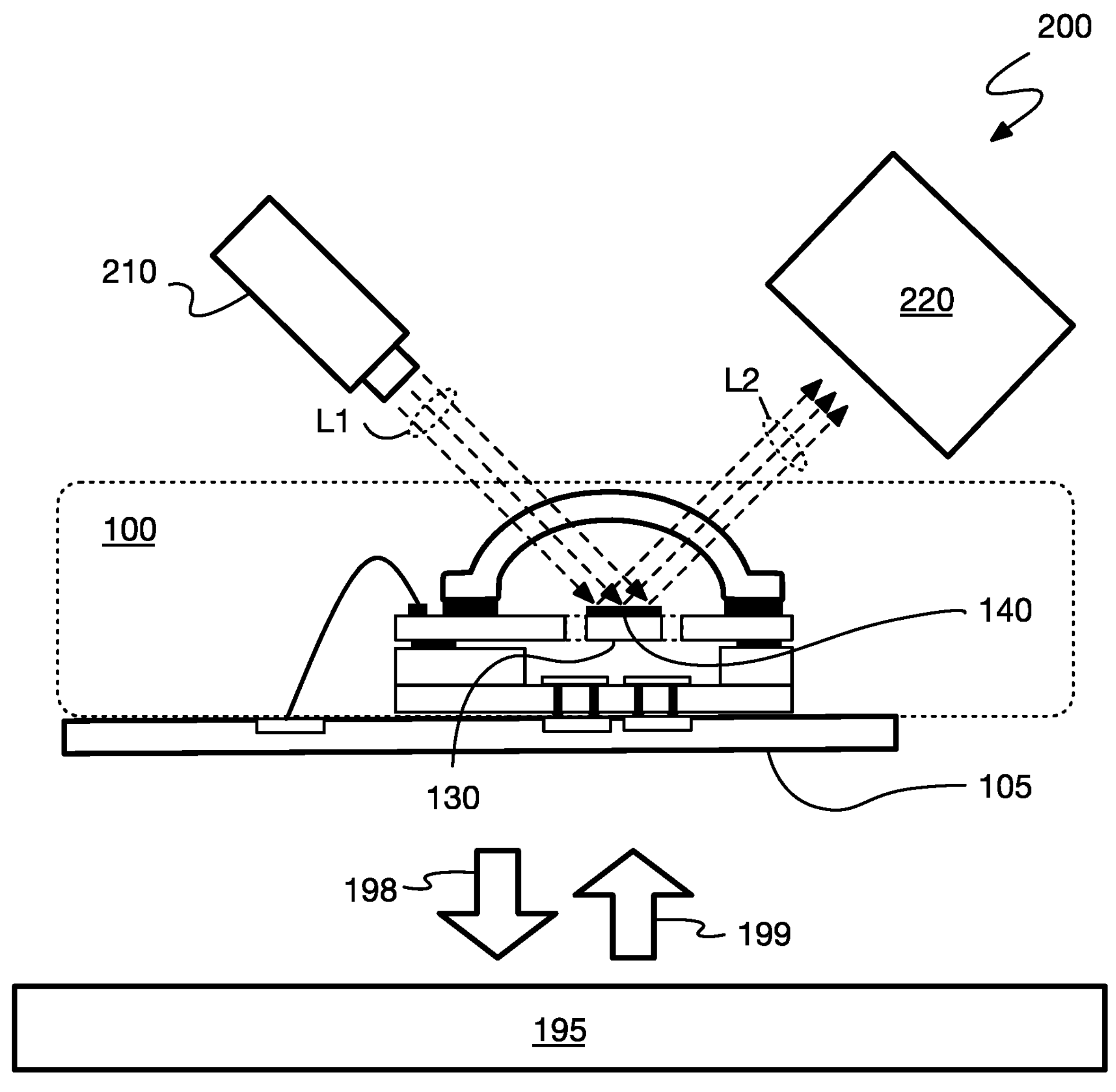

FIG. 2 schematically shows an exemplary structure of a projection system 200 for projecting Lissajous figures onto an observation field 220. In particular, the microscanner 100 from FIG. 1 can be used for this purpose. On its mirrored surface 140, which is used as a reflective surface, by means of a laser 210 used as a source of electromagnetic radiation, in particular visible light, a beam L1 of incident light is generated and directed it onto the reflective surface 140, to be reflected there and imaged as a deflected beam L2 on the observation field 220 in order to illuminate this at least in sections. The observation field can be defined by a projection surface, for example by a smooth surface such as a projection screen or a floor or road surface. In addition to the simplest case of pure reflection shown in FIG. 2, in addition to the deflection element or mirror 130/140, one or more further optical elements can be provided for defining the image, in particular in the form of mirrors or optical lenses.

Figure 3:
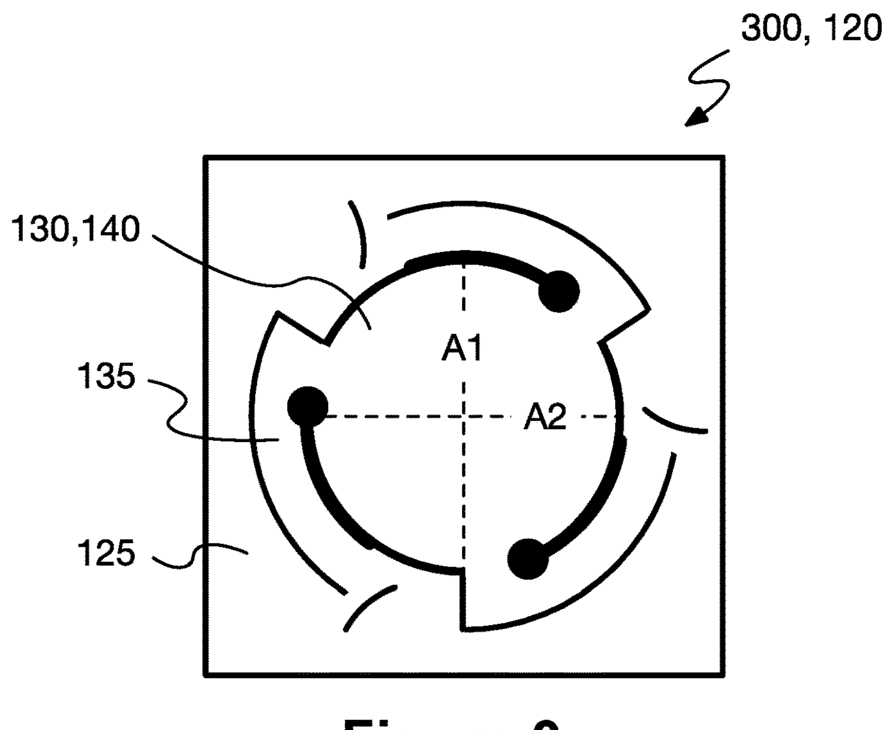
FIG. 3 shows a schematic top view of a deflection unit with a gimballess MiniFaros mirror, which is usable in particular in the microscanner from FIG. 1.
Figure 4:
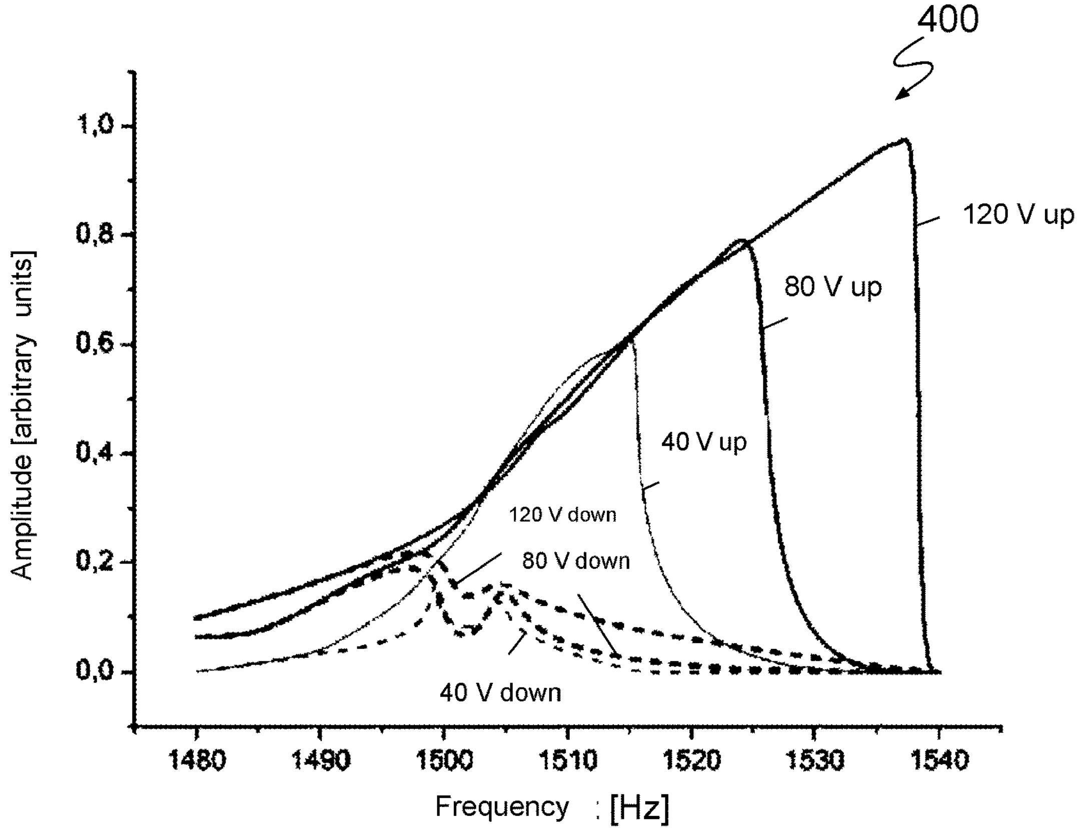
FIG. 4 shows an exemplary frequency response of the gimballless MiniFaros mirror from FIG. 3.

FIG. 3 shows a schematic top view of a deflection unit 300 having a gimballess MiniFaros mirror, which can be used in particular in the microscanner 100 from FIG. 1 or in the projection system 200 from FIG. 2. FIG. 4 shows an associated frequency response of the amplitude of the deflection element upon excitation with respect to an oscillation axis for this purpose.

In this specific embodiment, the microscanner can be designed in particular as a biaxial microscanner 300. Its deflection unit 101 includes a deflection element 130, 140 designed as a mirror plate here. It is suspended from a frame section 125 of the substrate 120 that surrounds it and is used as a supporting structure by means of three rotationally symmetrically arranged spring elements 135, which together form a spring device. The suspension is configured in such a way that the deflection element 130, 140 (mirror) is suspended on the frame section 125 in a gimballess manner in such a way that relative thereto, it can simultaneously execute a first rotational oscillation with respect to a first oscillation axis $A_1$ and a second rotational oscillation around a second oscillation axis $A_2$ orthogonal thereto in order to cause a non-linear Lissajous projection in the observation field 220 by deflecting an electromagnetic beam L1 incident on the deflection element during the simultaneous oscillations. This course of the two mutually orthogonal oscillation axes $A_1$ and $A_2$ is dependent on the course of the excitation due to the rotational symmetry with respect to the three suspensions, which are each 120 degrees apart along the mirror circumference.

Due to the special configuration of the spring device, the oscillations around the two axes $A_1$ and $A_2$ are strongly coupled here, so that they are no longer independent. In fact, in this case, unlike the harmonic oscillator, the effective spring stiffnesses $k_1$ and $k_2$ are each time-dependent functions of the actual mechanical amplitudes (deflections) $\theta_{1,i}(t)$ and $\theta_{2,i}(t)$ with respect to the two oscillation axes $A_1$ and $A_2$:

$$k_1 = k_1(\theta_{1,i}(t), \theta_{2,i}(t)) \text{ and } k_2 = k_2(\theta_{1,i}(t), \theta_{2,i}(t)). \tag{3}$$

In the case of the MiniFaros mirror type, the coupling or interaction between the two oscillations can usually be seen very clearly. Both oscillation axes are defined by all three springs 135. This means that all three springs 135 are also involved in both axes $A_1$ and $A_2$, in contrast to the gimballed mirror. In the latter, each oscillation axis has its own pair of torsion suspensions.

If the MiniFaros mirror is driven conventionally, i.e., without using the special control according to the invention, by internal or external forces, then it first begins to oscillate linearly in an axis $A_1$ or $A_2$. If one then increases the frequency f and approaches the resonant frequency of the second axis, then more and more vibrational energy migrates from the second of the first oscillation around the axis $A_1$ to the second oscillation around the axis $A_2$ and the mirror 130/140 no longer oscillates only linearly but elliptically. This ellipse becomes larger and larger in diameter and at the same time the ellipse becomes more and more circular. This means that the vibration energy supplied is increasingly transferred from one axis to the other due to the strong interaction between the two axes.

The second axis synchronizes itself with regard to the phase position, because then there is no oscillation with any phase relationship between the axes, but an ellipse or a circle, which is equivalent to a synchronized phase position of the two axes $A_1$ and $A_2$, although the energy was only supplied via one axis.

An interesting and important feature of the strongly interacting axes are the nonlinearly working spring suspensions 135. This results in a pronounced non-linear resonance—in the case of MiniFaros mirrors it is a matter of so-called "stress stiffening" or "spring stiffening" with a "sloping pointed cap" toward higher frequencies, as shown in FIG. 4 as the frequency responses of the oscillation amplitude, for example, for axis $A_1$.

The spring stiffnesses $k_1$ and $k_2$ according to the above-mentioned equation (3) increase here both as a function of the first amplitude $\theta_1$ and of the second amplitude $\theta_2$ as the respective amplitude increases. The result of this is that the microscanner 100 can only be driven into resonance here from lower to higher frequencies in order to achieve the maximum amplitude occurring at the resonance point. In addition, one has to start from the lower of the two resonant frequencies in order to be able to excite the oscillations to both axes $A_1$ and $A_2$ at all. If one starts at the higher of the two resonant frequencies, the oscillation remains uniaxial.

FIG. 4 shows a family of corresponding frequency responses for three different activation voltages at the level of 40 V, 80 V, and 120 V for the drive device 105, wherein a higher activation voltage corresponds to a greater maximum amplitude with an otherwise identical operating mode. It can be clearly seen that when oscillating with an increasing frequency curve ("up"), the above-mentioned peak-shaped amplitude curves result with only one pronounced maximum, which is due to the synchronized axes ($f_{1,i} \approx f_{2,i}$ or $f_{1R} \approx f_{2R} \approx f_R$).

Instead of an almost vertical, narrow resonance peak, there is a clear broadening of the resonance curve toward higher frequencies during oscillation as the oscillation amplitude increases. The greater the oscillation amplitude, the more the suspension stiffens, i.e., the spring stiffness k increases, and the more strongly the resonant frequency $f_R$ changes. This leads to a broadening of the bandwidth (frequency tuning range).

If instead the oscillation were to be carried out with decreasing excitation frequency ("down"), significantly different frequency responses would result, with separate and less pronounced maxima for the resonant frequencies $f_{1R}$ and $f_{2R}$, which then remain separate, of the two axes $A_1$ and $A_2$.

Non-linear 2D microscanners without gimbals almost always have very strong coupling. The strongly non-linear resonance results in a large tuning range—i.e., a large bandwidth within which the microscanner can oscillate in resonance. Depending on the embodiment, this can be 200 Hz for the MiniFaros mirror, for example, which is very high in relation to the bandwidth of less than 1 Hz that is typical for high-quality gimbal scanners.

These non-linear coupling 2D mirrors are no longer a combination of two harmonic oscillators, because according to equation (3) there is no longer a spring force that increases linearly with the amplitude based on a "spring constant", i.e., no harmonic behavior. Rather, it is a spring force that is strongly non-linearly dependent on the amplitude and can be described as a so-called "Duffing oscillator".

It is to be noted that the MiniFaros mirror, despite a possible circular path/elliptical shape of the resulting Lissajous image, usually does not have identical but two different resonant frequencies, which in the ground state (low oscillation amplitude) can be approximately 100 Hz apart. However, as the axis having the lower resonant frequency oscillates, the oscillator detunes so much towards higher frequencies that the frequencies of the two axes become more and more the same until they finally overlap ($f_{1R} \approx f_{2R}$) and completely enable the energy exchange. Thus, the deflection unit 300 is actually not readily suitable for planar illumination of an observation field by means of Lissajous projection beyond the imaging of elliptical, in particular circular, lines instead of a desired planar illumination.

If, on the other hand, a control device according to the invention is used to control the drive device of the microscanner 100, extensive, in particular also at least approximately rectangular, illumination is possible by means of tuning the amplitude. The frequency maxima for the two oscillations or axes can then be maintained even when oscillating with increasing frequency, since these frequencies are always set with regard to their frequency distance in such a way that they cannot fall below a predetermined minimum frequency distance $f_{TH}$ and this results in illumination that deviates from an elliptical shape.

Figure 5:
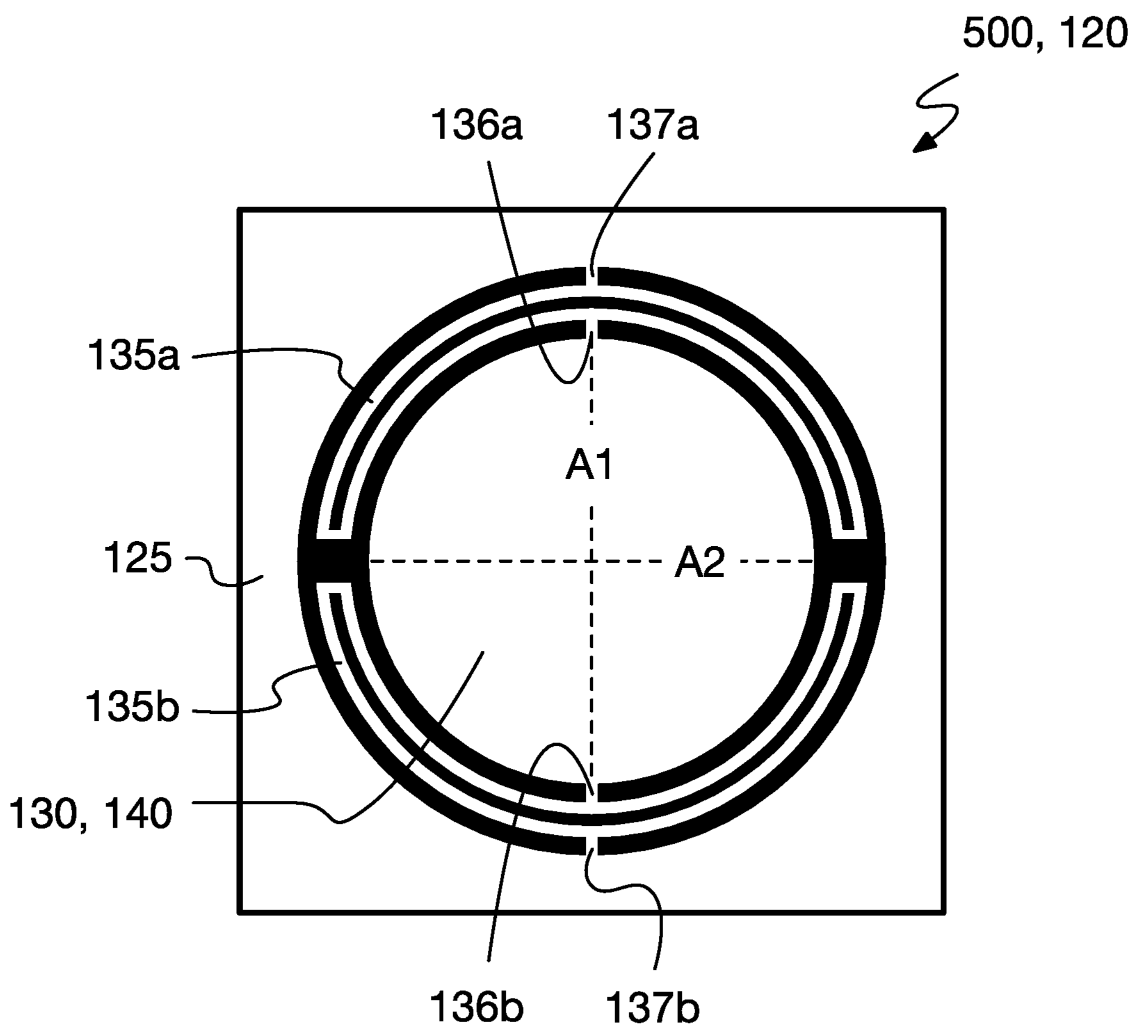
FIG. 5 shows a schematic top view of a deflection unit of an exemplary further gimballless mirror variant ("KOLA") using arcuate flexible springs as the spring device, which can be used in particular in the microscanner from FIG. 1.

FIG. 5 shows a schematic top view of a deflection unit 500 having a gimballess mirror (designated here as type "KOLA") according to another embodiment of the deflection unit 101, in particular of the substrate 120. This embodiment can again also be used in particular in the microscanner 100 from FIG. 1 or in the projection system 200 from FIG. 2.

The KOLA microscanner is a biaxial gimballess microscanner, in which the deflection unit 500 includes a deflection element (mirror) 130, 140, which is suspended on each of two opposite sides by means of a firmly clamped flexible spring 135*a*, 135*b* on a (rigid) frame section 125, in particular a chip. The flexible springs 135*a*, 135*b* each have two arcuate sections which are connected to one another at their end faces and otherwise extend spaced apart adjacent to one another and which extend around the deflection element 130, 140. The respective section of each flexible spring adjacent to the deflection element 130, 140 is connected to the deflection element 130, 140 by means of an inner connecting web 136*a* or 136*b*. The respective section of each flexible spring 135*a*, 135*b* adjacent to the frame section 125 is connected to the frame section 125 by means of an outer connecting web 137*a* or 137*b*.

The length of the flexible springs 135*a*, 135*b* can be designed in such a way that they extend as long and wide as possible along the outer contour of the deflection element, preferably once perpendicularly away from the oscillation axis of rotation $A_1$ (approximately a quarter of a circle to each side) and then returning to this axis $A_1$ again. This course of the flexible springs allows the deflection element 130, 140 to be movable in both mutually orthogonal oscillation axes $A_1$ and $A_2$, the respective bearing of which is defined by the structure of the spring device having the described suspension.

The two axes or the associated oscillations show a strong coupling and thus a pronounced interaction when the oscillation amplitudes are very large. In particular, each amplitude of the deflection element 130, 140 around the first axis $A_1$ immediately results in a stiffening of the entire flexible spring 135*a* or 125*b*, which, however, influences both oscillation axes $A_1$ and $A_2$. As a result, the relevant spring constant or amplitude-dependent spring function $k_1$ is not only periodically detuned for the oscillation of the first axis $A_1$, but at the same time also the relevant spring function $k_2$ for the second axis $A_2$ perpendicular thereto, and vice versa. Thus, both spring functions are time-dependent functions according to equation (3).

This periodic stiffening results in a periodic shift of the respective resonant frequencies $f_{1R}$ and $f_{2R}$ of the two oscillations to the axes $A_1$ and $A_2$. This means: The oscillation of the first axis $A_1$ periodically detunes the resonant frequency $f_{2R}$ of the second axis $A_2$ and the oscillation of the second axis $A_2$ conversely periodically detunes the resonant frequency $f_{1R}$ of the first axis $A_1$. In addition, the two axes $A_1$ and $A_2$ are permanently transmitting vibrational energy, exchanging it with one another, and storing it.

Figure 6:
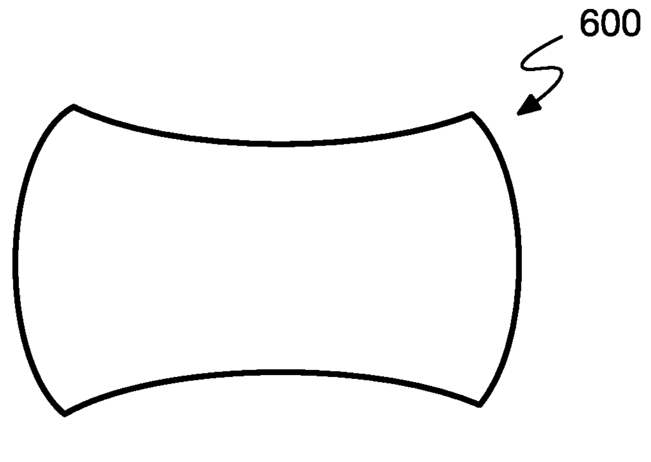
FIG. 6 shows an exemplary recording of the cross section of a non-compensated planar illumination area that is constricted and deformed in relation to a rectangle in a microscanner having a deflection unit according to FIG. 5.

In the KOLA microscanner, this results in modulated mirror oscillation amplitudes $\theta_1(t)$ and $\theta_2(t)$. If no controller according to the invention is used, the scan pattern resulting here during the projection in the observation field 220 therefore does not have a completely rectangular shape in cross section, but rather shows a clear constriction, particularly in one axis. This is schematically illustrated in FIG. 6.

If, on the other hand, a control device according to the invention is used to control the drive device of the microscanner 100, extensive, in particular also at least approximately rectangular, illumination is possible by means of tuning the amplitude. The frequency maxima for the two oscillations or axes can then also be maintained when oscillating with increasing frequency, since these frequencies are always set in terms of their frequency distance $f_{1,i}-f_{2,i}$ (or $|f_{1,i}-f_{2,i}|$ so that they do not fall below a predetermined minimum frequency distance $f_{TH}$.

Figure 7:
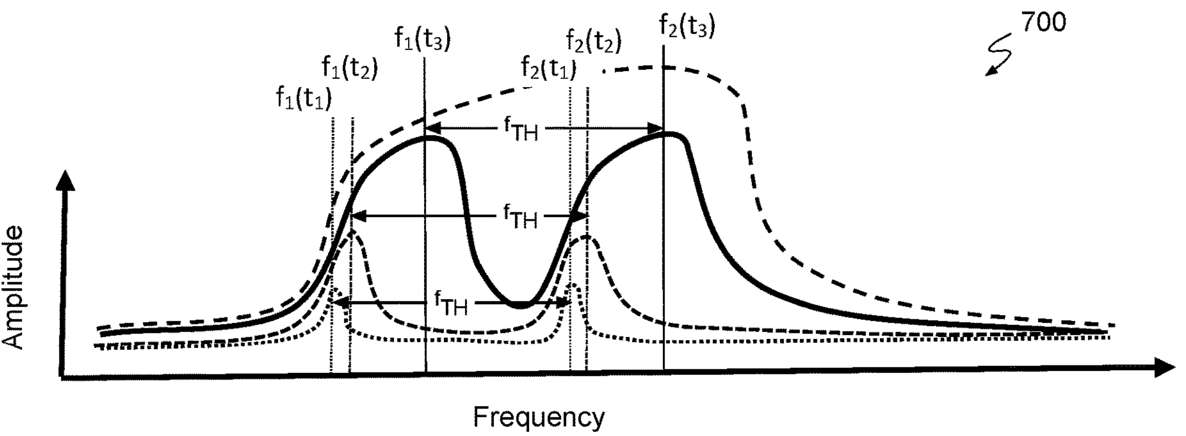
FIG. 7 shows a frequency response diagram to illustrate an example of maintaining a required minimum frequency distance during the oscillation of a microscanner according to the invention, in order to avoid self-synchronization taking place as the amplitude increases and rigid phase and frequency coupling thus occurring.
Figure 8:
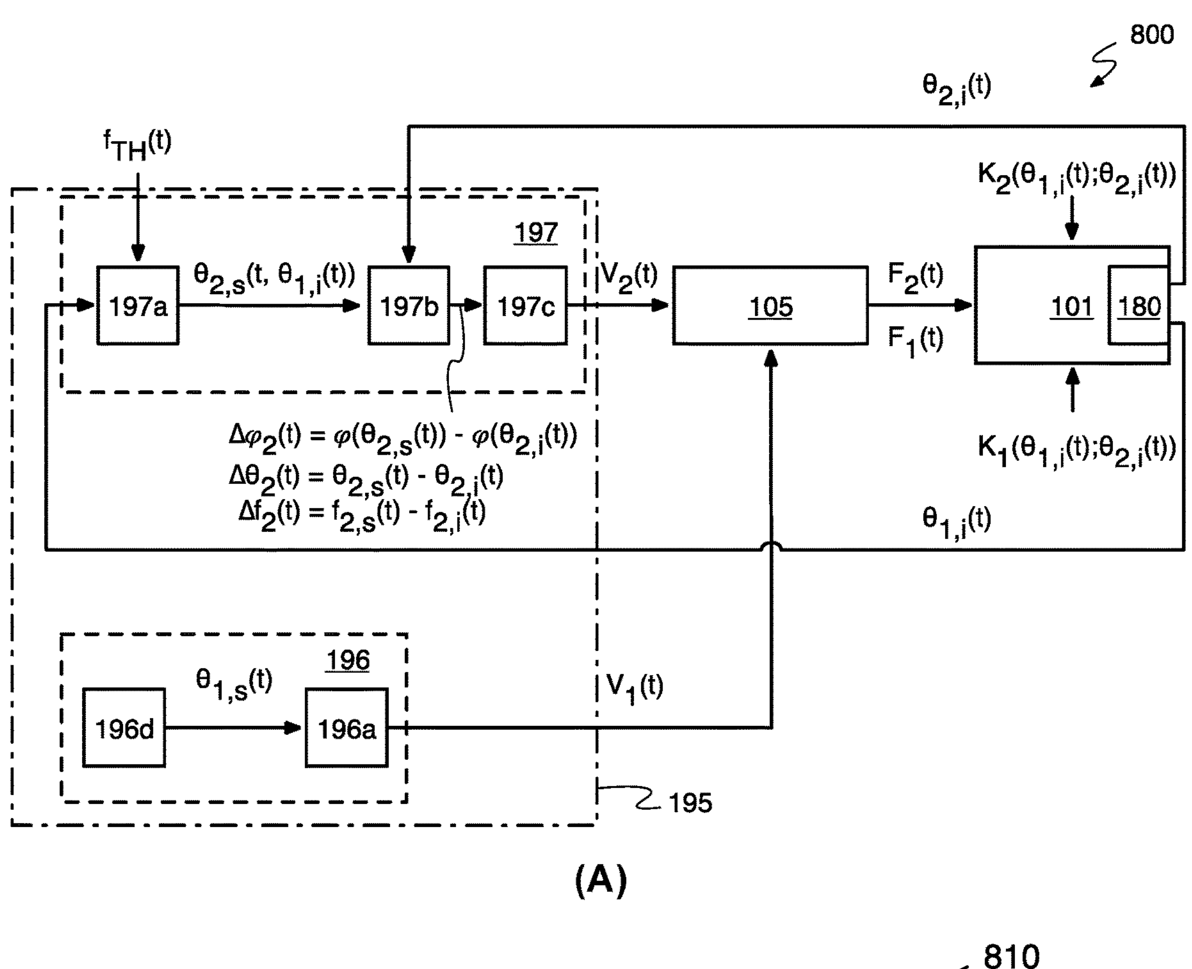
FIG. 8(A) shows a block diagram of an exemplary combined open-loop/closed-loop control (open-loop for one axis, closed-loop for another axis) of the micro-scanner of FIG. 1, according to some embodiments of the invention.
FIG. 8(B) shows an exemplary frequency curve for the two oscillations when the microscanner from FIG. 8(A) oscillates.
Figure 8:
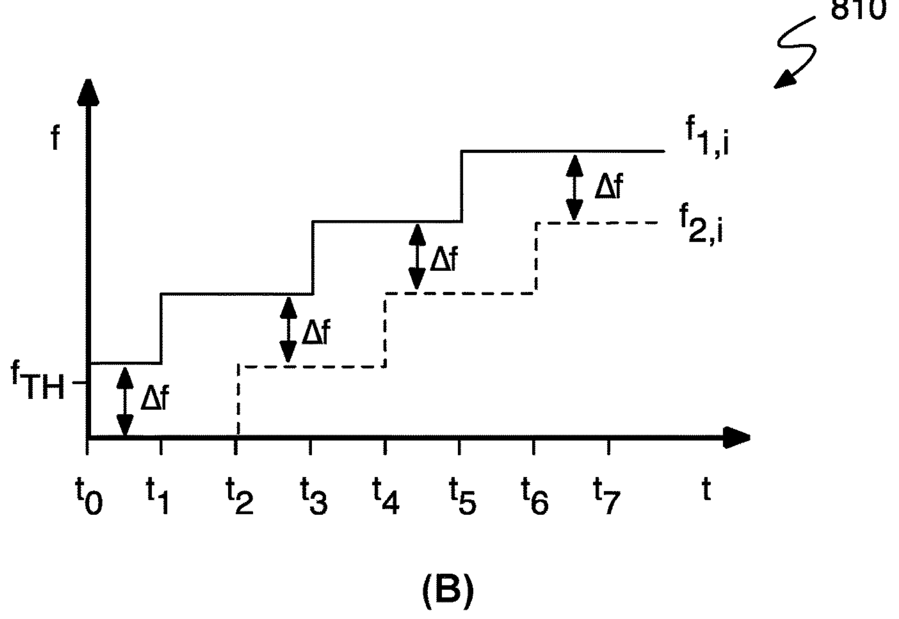

FIG. 7 shows a frequency response diagram to illustrate an example of maintaining a required minimum frequency distance during the oscillation of a microscanner according to the invention, in order to avoid self-synchronization taking place as the amplitude increases and rigid phase and frequency coupling thus occurring.

The three lower curve profiles show the actual frequency response of the amplitude of the oscillation of the deflection element (relative to any one of the two axes) at different consecutive points in time $t_1$, $t_2$, and $t_3$ of the oscillation process. The uppermost curve shown in dashed lines in FIG. 7 represents the state when the amplitude of the oscillator having the lower resonant frequency has increased to such an extent that the resonance of one axis is superimposed on that of the other axis (having the higher resonant frequency). In this state, the first oscillator attempts to synchronize the second. This "growing together" can only be prevented if the two resonators maintain their separation by both oscillating at the same time and thereby displaying stress-stiffening in the same direction. $f_1$ (abbreviation for $f_{1R}$) designates the instantaneous (amplitude-dependent) resonant frequency for the first oscillation axis $A_1$ and $f_2$ (abbreviation for $f_{2R}$) accordingly designates the respective instantaneous (amplitude-dependent) resonant frequency for the second oscillation axis $A_2$. When using a microscanner according to the invention, strong couplings between the various oscillations or associated oscillation axes $A_1$ and $A_2$ occur on the one hand due to the gimballless deflection unit used. On the other hand, however, the control unit 195 actively counteracts synchronization of these oscillations or short oscillation axes in order to maintain a minimum frequency distance $f_{TH}$ and thus prevent the two resonant frequencies $f_1$ and $f_2$ (or $f_{1R}$ and $f_{2R}$) from merging. Consequently, the resulting Lissajous figures also do not represent mere ellipses, as would be the case with $f_1=f_2$ (or $f_{1R}=f_{2R}$), but rather, with a suitable selection of the excitation by the drive unit 105, they can induce differently shaped, planner, in particular even right-angled illumination areas in the observation field 220.

FIG. 8(A) shows a block diagram of an exemplary embodiment 800 of the micro-scanner from FIG. 1 with combined open-loop/closed-loop control (open-loop for one axis, closed-loop for another axis).

The control device 195 has, on the one hand, an open-loop control unit 196 (open-loop) for the first oscillation with respect to the first axis $A_1$ and, on the other hand, a closed-loop control unit 197 (closed-loop) for the second oscillation with respect to the second axis $A_2$. The open-loop controller 196 supplies a first activation signal in the form of a time-dependent voltage $V_1(t)$ for controlling the piezo actuator 105 with regard to the first oscillation. In contrast, the closed-loop controller 197 supplies a second activation signal (more precisely, a controlled variable signal) in the form of a time-dependent voltage $V_2(t)$ for controlling the piezo actuator 105 with regard to the second oscillation. The two voltages $V_1(t)$ and $V_2(t)$ correspond to the control signals or controlled variable signals 199 from FIG. 1 or FIG. 2. Due to this activation, the piezoelectric actuator 105 carries out movements acting on the first and second oscillation axis $A_1$ and $A_2$ and exerts, due to its mechanical coupling to the deflection unit 101, corresponding mechanical forces $F_1(t)$ and $F_2(t)$, to drive the first oscillation and the second oscillations, in particular each resonant, i.e., according to their respective instantaneous resonant frequency $f_{1R}$ or $f_{2R}$. Since the deflection unit 101 is of the gimballless type, there are non-negligible mechanical couplings $K_1(\theta_{1,i}(t);\ \theta_{2,i}(t))$ on the first oscillation and $K_2(\theta_{1,i}(t);\ \theta_{2,i}(t))$ on the second oscillation between the two oscillation axes $A_1$ and $A_2$, which are each dependent on the actual amplitudes $\theta_{1,i}(t)$ and $\theta_{2,i}(t)$ and are therefore also time-dependent.

The control unit 196 has a control controller **196*a* for the first oscillation, which can access a lookup table 196*d* in which control data are stored that represent a time setpoint curve $\theta_{1,s}(t)$ of the amplitude of the first oscillation during the oscillation of the microscanner 800. In accordance with the control data, the control controller 196*a* generates the time-dependent voltage $V_1(t)$ for controlling the piezo actuator 105 with regard to the first oscillation and outputs this to the piezo actuator 105** to activate it.

While the above-mentioned control of the first oscillation is an open-loop control, the control for the second oscillation has a closed-loop, using which an instantaneous location of the deflection element (mirror) 130, 140, detected by means of the bottom electrode 180 of the deflection unit 101 and given by the instantaneous actual amplitudes $\theta_{1,i}(t)$ and $\theta_{2,i}(t)$, is fed back to the control unit 197 as an input signal. The returned amplitude $\theta_{1,i}(t)$ is fed to a control controller **197*a* of the control unit 197, which determines a target value $\theta_{2,s}(t)$ for the amplitude of the second oscillation, taking into consideration the optionally time-dependent minimum frequency distance $f_{TH}$. Since the amplitude is mutually dependent on the frequency of the second oscillation, as shown by way of example in FIG. 7**, a setpoint for the instantaneous frequency of the second oscillation is thus also defined.

The setpoint $\theta_{2,s}(t)$ is fed to a difference detector **197*b* for the second oscillation, which can be configured in particular to detect a phase difference $\Delta\varphi_2(t)$ between the setpoint $\theta_{2,s}(t)$ and the returned actual value $\theta_{2,i}(t)$ of the amplitude of the second oscillation, and via a downstream controller or loop filter to generate a controlled variable signal $V_2(t)$ determined in terms of phase synchronization and to output it to the piezo actuator 105**. Alternatively or additionally, an amplitude control or a direct frequency control can also be provided in an analogous manner.

FIG. 8(B) shows an exemplary frequency curve for the two oscillations when the microscanner from FIG. 8(A) oscillates. If, according to this example, the controlled first oscillation runs in such a way that its actual frequency $f_{1,i}$ takes the stepped course shown by the continuous characteristic curve, the closed-loop control for the second oscillation can be designed in such a way that it takes the stepped course shown by the dashed characteristic curve, in which the minimum frequency distance $f_{TH}$ is always maintained. The oscillation of the microscanner thus takes place alternately in time with respect to the two oscillations. Using the closed-loop control for the second oscillation, which is dependent on the first oscillation via the coupling $K_2(\theta_{1,i}(t);\ \theta_{2,i}(t))$, biaxial oscillation can be achieved while maintaining the minimum frequency distance $f_{TH}$.

FIG. 9 shows a block diagram of an exemplary double closed-loop control (closed-loop for both axes) of the microscanner from FIG. 1 according to a further embodiment 900 of the invention, wherein signal-based feedback between the two closed-loop controls only takes place unidirectionally, however.

The microscanner 900 is based on the microscanner 800 from FIG. 8(A), in that instead of the open-loop control for the first oscillation, a closed-loop control, in particular a closed-loop phase control, is also provided there. Accordingly, the open-loop control unit is replaced by a closed-loop control unit 196 and the actual amplitude $\theta_{1,i}(t)$ of the first oscillation is also measured at the deflection element and fed back to the closed-loop control unit 196 in order to also close a control loop for the first oscillation.

As a result, there is now a separate closed-loop control for each of the two oscillations, wherein the closed-loop control for the first oscillation functions as a master closed-loop control in the sense that it does not take the closed-loop control of the second oscillation into consideration and accordingly also does not receive a returned actual amplitude $\theta_{2,i}(t)$ of the second oscillation. In contrast, the closed-loop control for the second oscillation acts as a slave closed-loop control, the setpoint determination of which depends on the returned actual amplitude $\theta_{1,i}(t)$ of the first oscillation and the minimum frequency difference $f_{TH}$ used as a further input variable. Ensuring that the minimum frequency distance is maintained thus depends on the closed-loop control for the second oscillation, while each of the two closed-loop controls also ensures that the respective drive signals $V_1(t)$ and $V_2(t)$ each act in phase with the actual course of their respective oscillation and thus assist a corresponding resonance operation of the deflection unit 101.

FIG. 10 shows a block diagram of an exemplary double closed-loop control (closed-loop for both axes) of the microscanner from FIG. 1 according to still another embodiment of the invention 1000, wherein signal-based bidirectional feedback takes place between the two closed-loop controls.

The microscanner 1000 is based on the microscanner 900 from FIG. 9 in that the closed-loop control for the first oscillation now also receives feedback of the actual amplitude $\theta_{2,i}(t)$ of the second oscillation and the minimum frequency distance $f_{TH}$ as input signals. This results in a symmetrical structure in which the closed-loop control for the first oscillation is influenced by the second oscillation and vice versa. Ensuring that the minimum frequency distance is maintained thus depends on the closed-loop controls for both oscillations, while each of the two closed-loop controls also ensures that the respective drive signals $V_1(t)$ and $V_2(t)$ each act in phase with the actual course of their respective oscillation and thus assist a corresponding resonance operation of the deflection unit 101.

In this case, these respective closed-loop controls controls for the first and the second oscillation are each designed to be dynamically configured or configurable with respect to their respective slope and control speed as a function of the slope and control speed of the respective other closed-loop control. This tuning is advantageous in that it allows the axles to oscillate at approximately the same speed and thus the original resonant frequencies of the axles to be shifted at approximately the same speed, in particular towards higher frequencies when the spring stiffness increases with increasing amplitude.

In order to reduce or ideally entirely eliminate the risk of control instabilities from the outset, in particular the maximum speed at which frequencies or amplitudes can change can be limited in the control loops, possibly also as part of a calibration resulting from a calibration process. Since the frequencies are usually very high, for example a few kilohertz, a very controlled, safe procedure can also take place within a very short period of time for this purpose.

While at least one exemplary embodiment has been described above, it is to be noted that a large number of variations thereto exist. It is also to be noted that the exemplary embodiments described only represent non-limiting examples, and are not intended to restrict the scope, the applicability, or the configuration of the devices and methods described herein. Rather, the preceding description will provide those skilled in the art with guidance for implementing at least one exemplary embodiment, wherein it is apparent that various changes in the operation and arrangement of elements described in an exemplary embodiment may be made without departing from the scope of the subject matter defined in the appended claims and its legal equivalents.

LIST OF REFERENCE SIGNS

100 micro scanner
101 deflection unit
105 drive device, in particular piezo actuator
110 third substrate, bottom plate
115 fourth substrate, spacer layer
120 first substrate
125 frame portion
130 mirror portion
135 spring element
135*a,b* flexible springs
136*a,b* inner connecting webs
137*a,b* outer connecting webs
140 metallic mirror coating, mirror electrode
145 second substrate, cupola-shaped
150 substrate bonding material
155 further substrate bonding material
160 bond wire
165 connecting pad on first substrate 120 for connecting the upper electrode (top electrode) 140
170 connecting pad on piezo actuator 105 for connecting the upper electrode 140
175*a* upper area of the cavity 175
175*b* lower area of the cavity 175
180 structured, possibly multi-part bottom electrode
185 vias with solder bumps for contacting the piezo actuator
190 connecting pads on piezo actuator 105 for connecting the bottom electrode
195 control device
196 open-loop control unit or closed-loop control unit for first oscillation
196*a* control controller for first oscillation
196*b* difference detector for first oscillation
196*c* closed-loop controller or loop filter (in the phase-locked loop) for the first oscillation first
196*d* look-up table
197 closed-loop control unit for second oscillation
197*a* control controller for second oscillation
197*b* difference detector for second oscillation
197*c* closed-loop controller or loop filter (in the phase-locked loop) for second oscillation
198 measurement signals for feedback(s) in control loop(s) and position measurement
199 control signals or controlled variable signals
200 projection system
210 light source, in particular laser
220 observation field, especially projection surface
300 deflection unit having a gimballless MiniFaros mirror
400 frequency response of the gimballless MiniFaros mirror
500 deflection unit having a gimballless KOLA mirror
600 constricted and deformed planar illumination area
700 frequency response
800 block diagram of a mixed open-loop control (open-loop)/closed-loop control (closed-loop)

900 block diagram of a unidirectionally coupled two-axis control (closed-loop)

1000 Block diagram of a bidirectionally coupled control (closed-loop)

$A_1$ first oscillation axis $A_2$ second oscillation axis $F_1$, $F_2$ axis-specific drive forces from drive device to deflection element $K_1(\ldots)$ mechanical axis coupling to the first axis $K_2(\ldots)$ mechanical axis coupling to the second axis $L_1$ incident light beam $L_2$ light beam reflected at the mirror $V_1$, $V_2$ control voltages for activating the drive device f frequency $f_1$ setpoint frequency of the first oscillation $f_2$ setpoint frequency of the second oscillation $\Delta f$ frequency difference $f_{TH}$ minimum frequency distance $\theta_{1,i}$ actual amplitude of the first oscillation to the first oscillation axis $A_1$ $\theta_{1,s}$ setpoint amplitude of the first oscillation to the first oscillation axis $A_1$ $\theta_{2,i}$ actual amplitude of the second oscillation to the first oscillation axis $A_2$ $\theta_{2,s}$ setpoint amplitude of the second oscillation to the first oscillation axis $A_2$ $\Delta\theta$ amplitude difference $\varphi$ phase $\Delta\varphi$ phase difference t time

What is claimed is:

1. A microscanner for a projection system for projecting Lissajous figures onto an observation field, wherein the microscanner comprises:

a deflection unit having a deflection element for deflecting an incident electromagnetic beam, a support structure, and a spring device, wherein the deflection element is suspended in a gimballess manner by means of the spring device on the support structure in such a way that, relative to the support structure, it can simultaneously perform a first rotary oscillation around a first axis of oscillation and a second rotary oscillation around a second axis of oscillation orthogonal thereto to cause a non-linear Lissajous projection in an observation field by deflecting an electromagnetic beam incident on the deflection element during the simultaneous oscillations; and a control device, which is configured to activate a drive device for driving the deflection unit in such a way that a respective drive effect with respect to at least one of the oscillations of the deflection element is settable individually;

wherein the spring device is furthermore designed in such a way that it mediates an amplitude-dependent mutual coupling between the oscillations; and wherein the control device is also configured to activate the drive device as a function of at least one detected state variable of the first oscillation in order to induce a drive effect as a function of at least one detected state variable on the second oscillation by influencing at least one state variable of the second oscillation, so that the drive effect counteracts falling below a predetermined minimum frequency distance between the respective instantaneous oscillation frequencies of the first oscillation and the second oscillation.

2. The microscanner of claim 1, wherein the control device is also configured to activate the drive device;

s a function of at least one detected state variable of the second oscillation in order to induce a drive effect on the first oscillation by influencing at least one state variable of the first oscillation, which counteracts falling below a predetermined minimum frequency distance between the respective instantaneous oscillation frequencies of the first oscillation and the second oscillation; or independently of a state variable ($\theta_{2,i}$, $f_{2,i}$, $\varphi_{2,i}$) of the second oscillation in order to induce a drive effect on the first oscillation by influencing at least one state variable ($\theta_{1,i}$, $f_{1,i}$, $\varphi_{1,i}$) of the first oscillation.

3. The microscanner of claim 1, wherein the respective at least one state variable of a respective oscillation is determined by its amplitude, frequency, or phase or as a function of at least one of these variables.

4. The microscanner of claim 1, wherein the control device is configured to activate the drive device to induce the respective drive effect on at least one oscillation driven thereby in the sense of a closed-loop control as a function of at least one repeatedly detected controlled variable which is a state variable of the respective other oscillation or is defined as a function thereof.

5. The microscanner of claim 4, wherein if the controlled variable for the drive control of the respectively driven oscillation is defined as a frequency or phase of the respective other oscillation or as a function of at least one of these state variables, the detection of this controlled variable always takes place at the same amplitude of this respective other oscillation.

6. The microscanner of claim 4, wherein the control device is configured to:

carry out both the first oscillation and the second oscillation in the sense of a closed-loop control as a function of at least one repeatedly detected controlled variable which is a state variable of the respective other oscillation or is defined as a function thereof, wherein these respective closed-loop controls for the first and the second oscillation are each designed to be dynamically configurable with respect to their respective slope and control speed as a function of the slope and control speed of the respective other closed-loop control; and/or activate the drive device to induce the respective drive effect on the respective oscillation driven thereby in the sense of an open-loop control as a function of the at least one detected state variable of the respective other oscillation.

7. The microscanner of claim 5, wherein the control device is configured to control the drive device to induce the respective drive effect on the respective oscillation thereby driven in such a way that the drive device effectuates an alternating, with respect to the first oscillation and the second oscillation, and step-by-step increase of the respective amplitude or frequency of these oscillations.

8. The microscanner of claim 1, wherein the control device is furthermore configured to activate the drive device in such a way that the respective frequency of at least one of the oscillations is kept within a predetermined, limited resonance range surrounding a current resonant frequency of this oscillation.

9. The microscanner of claim 8, wherein the limits of the resonance range to a resonant frequency are defined by the values $f_R\pm700$, preferably $f_R\pm40\%$, more preferably $f_R\pm20\%$, even more preferably $f_R\pm10\%$ of the frequency value $f_R$ of the resonant frequency.

10. The microscanner of claim 1, wherein:

the minimum frequency distance is:

fixed as a constant dimension; or defined as a variable dimension that depends on the respective current amplitude of the first oscillation or the second oscillation or on the respective current amplitudes of these two oscillations.

11. The microscanner of claim 1, wherein the spring device is designed such that the strength of the amplitude-dependent mutual coupling between the first oscillation and the second oscillation steadily increases with increasing amplitude at least one of these two oscillations.

12. The microscanner of claim 1, wherein the microscanner is designed as a biaxial microscanner, in which the deflection unit includes a deflection element that is suspended on a frame, which is used as a support frame and surrounds it, by means of three rotationally symmetrically arranged spring elements.

13. The microscanner of claim 1, which is designed as a biaxial gimballess microscanner, in which:

the deflection unit includes a deflection element which is suspended, firmly clamped on two opposite sides in each case by means of a flexible spring, on a frame used as a support frame; and the flexible springs each have two curved sections which are connected to one another at their end faces and otherwise extend spaced apart adjacent to one another and which extend around the deflection element, wherein the respective section of each flexible spring adjacent to the deflection element is connected to the deflection element and the respective section of each flexible spring adjacent to the frame is connected to the frame.

14. The microscanner of claim 1, wherein the control device is configured, in the context of the activation of the drive device to drive the deflection unit in the sense of an amplitude adjustment, a frequency adjustment, or a phase adjustment, to set at least one corresponding state variable of the first oscillation, the second oscillation, or each of these two oscillations individually to a specific setpoint value.

15. The microscanner of claim 1, wherein:

the deflection element is suspended in a gimballess manner on the support structure by means of the spring device in such a way that it can simultaneously additionally execute a third rotational oscillation relative to the support structure with respect to a third oscillation axis that is orthogonal in each case to the first and second oscillation axes, in order to, by deflecting an electromagnetic beam incident on the deflection element during the three simultaneous oscillations, cause a non-linear Lissajous projection in the observation field, wherein the spring device is furthermore designed in such a way that it mediates an amplitude-dependent mutual coupling between the third oscillation and the first oscillation, the second oscillation, or both.

16. The microscanner of claim 14, wherein the control device is furthermore configured to activate the drive device as a function of at least one detected state variable of the first or second oscillation in order to induce a drive effect on the third oscillation by influencing at least one state variable of the third oscillation, which counteracts falling below a predetermined minimum frequency distance between the respective instantaneous oscillation frequencies of the first and second oscillations, on the one hand, and the third oscillation, on the other hand.

17. The microscanner of claim 1, furthermore including an encapsulation, by means of which at least the deflection element and the spring device are encapsulated in a hermetically sealed manner such that the deflection element in the encapsulation is capable of performing the oscillations and is suspended on the spring device so it can oscillate;

wherein the encapsulation includes an encapsulation section bridging the deflection element, through which the radiation to be deflected can be radiated into the spatial area encapsulated by the encapsulation and can be emitted again therefrom after it has been deflected at the deflection element.

18. The microscanner of claim 17, wherein the capsule section has a dome-shaped, a planar, or a right-angled U-shaped formation in cross section.

19. A projection system for projecting Lissajous figures on an observation field, wherein the projection system comprises a microscanner of claim 1.

20. The projection system of claim 19, wherein the control device is furthermore configured to supply a radiation source with at least one modulation signal as a function of which the incident electromagnetic beam is modulated.

* * * * *